United States Patent
Zlatniczki et al.

(10) Patent No.: US 12,063,403 B2
(45) Date of Patent: Aug. 13, 2024

(54) ESTIMATING VIDEO RESOLUTION DELIVERED BY AN ENCRYPTED VIDEO STREAM

(71) Applicant: Telefonaktiebolaget LM Ericsson (publ), Stockholm (SE)

(72) Inventors: Ádám Zlatniczki, Csongrád (HU); Botond Varga, Budapest (HU); Gábor Magyar, Dunaharaszti (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/021,954

(22) PCT Filed: Aug. 26, 2020

(86) PCT No.: PCT/EP2020/073869
§ 371 (c)(1),
(2) Date: Feb. 17, 2023

(87) PCT Pub. No.: WO2022/037798
PCT Pub. Date: Feb. 24, 2022

(65) Prior Publication Data
US 2023/0247244 A1    Aug. 3, 2023

(30) Foreign Application Priority Data

Aug. 18, 2020    (WO) ................. PCT/EP2020/073124

(51) Int. Cl.
*H04N 21/2662*    (2011.01)
*G06V 10/82*    (2022.01)
(Continued)

(52) U.S. Cl.
CPC ......... *H04N 21/2662* (2013.01); *G06V 10/82* (2022.01); *G06V 10/85* (2022.01); *H04N 21/234363* (2013.01); *H04N 21/2402* (2013.01)

(58) Field of Classification Search
CPC ................. G06V 10/82; G06V 10/85; H04N 21/234363; H04N 21/23895;
(Continued)

(56) References Cited

U.S. PATENT DOCUMENTS 6,665,705 B1 *  12/2003  Daniels-Barnes ......................... H04L 67/5682
709/213
8,014,393 B1 *  9/2011  Faheem .............. H04L 47/2416
370/468

(Continued)

FOREIGN PATENT DOCUMENTS

| EP | 3322127 A1 | 5/2018 |
|---|---|---|
| WO | 2019091591 A1 | 5/2019 |
| WO | 2020078575 A1 | 4/2020 |

OTHER PUBLICATIONS

International Search Report and the Written Opinion of the International Searching Authority, issued in corresponding International Application No. PCT/EP2020/073869, dated Jan. 18, 2021, 15 pages.

(Continued)

*Primary Examiner* — Michael B. Pierorazio
(74) *Attorney, Agent, or Firm* — Rothwell, Figg, Ernst & Manbeck, P.C.

(57) ABSTRACT

There is provided a method for estimating play out resolution of a video delivered to a client device by an encrypted video stream communicated over a network. The method selects a current chunk of the encrypted video stream comprising data packets expected to carry video data of the (Continued)

same level of playout resolution and determines values for a predetermined set of features indicative of conditions in the network. By accessing a pregenerated model, a corresponding set of state transition probabilities is obtained, defining a Markov chain whose states comprise the different levels of resolution. The determined state transition probabilities are then used to calculate, from a first probability distribution arising from a first or previous step in the Markov chain, a second probability distribution for the plurality of states of the Markov chain expected to result from the indicated network conditions.

20 Claims, 10 Drawing Sheets

(51) Int. Cl.
  *G06V 10/84* (2022.01)
  *H04N 21/2343* (2011.01)
  *H04N 21/24* (2011.01)
(58) Field of Classification Search
  CPC .......... H04N 21/2401; H04N 21/2402; H04N 21/2662; H04N 21/44209; H04N 21/4621; H04N 21/6131; H04N 21/64322; H04N 21/64792; H04N 21/8456
  See application file for complete search history.

(56) References Cited

U.S. PATENT DOCUMENTS

| | | | | |
|---|---|---|---|---|
| 8,135,040 | B2* | 3/2012 | Cuijpers | H04N 21/4384 725/90 |
| 8,514,891 | B2* | 8/2013 | Green | H04L 65/765 725/86 |
| 8,887,214 | B1* | 11/2014 | Black | H04N 21/64322 725/86 |
| 9,219,940 | B2* | 12/2015 | Gaillard | H04N 21/6405 |
| 9,264,508 | B2* | 2/2016 | Wolf | H04N 21/4384 |
| 9,628,405 | B2* | 4/2017 | Dasher | H04N 21/2662 |
| 10,362,081 | B2 | 7/2019 | Parthasarathy | |
| 11,330,333 | B2* | 5/2022 | Puente | H04N 21/222 |
| 2002/0166124 | A1* | 11/2002 | Gurantz | H04N 21/615 725/78 |
| 2004/0148421 | A1* | 7/2004 | Achtermann | H04L 12/1886 709/223 |
| 2004/0210944 | A1* | 10/2004 | Brassil | H04N 21/23424 725/135 |
| 2004/0244058 | A1* | 12/2004 | Carlucci | H04N 7/17327 348/E7.071 |
| 2008/0037420 | A1* | 2/2008 | Tang | H04L 1/187 370/231 |
| 2008/0098420 | A1* | 4/2008 | Khivesara | G06Q 30/02 725/32 |
| 2009/0025027 | A1* | 1/2009 | Craner | H04N 21/2385 725/116 |
| 2009/0100489 | A1* | 4/2009 | Strothmann | H04N 21/26266 725/114 |
| 2009/0150943 | A1* | 6/2009 | Vasudevan | H04N 21/6405 725/86 |
| 2010/0086020 | A1* | 4/2010 | Schlack | H04L 67/61 375/240.01 |
| 2010/0131969 | A1* | 5/2010 | Tidwell | H04N 21/4667 725/93 |
| 2010/0169916 | A1* | 7/2010 | Stettner | H04N 21/4532 725/34 |
| 2011/0096713 | A1* | 4/2011 | Rusert | H04N 21/6405 370/312 |
| 2011/0107379 | A1* | 5/2011 | Lajoie | H04L 65/611 725/151 |
| 2011/0126248 | A1* | 5/2011 | Fisher | H04N 21/26216 725/95 |
| 2011/0188439 | A1* | 8/2011 | Mao | H04N 21/6405 370/312 |
| 2011/0197239 | A1* | 8/2011 | Schlack | H04N 21/6408 725/95 |
| 2011/0270913 | A1 | 11/2011 | Jarnikov | |
| 2011/0302320 | A1* | 12/2011 | Dunstan | H04L 12/185 370/252 |
| 2012/0331513 | A1* | 12/2012 | Yamagishi | H04N 21/2362 725/95 |
| 2013/0007226 | A1* | 1/2013 | White | H04N 21/4383 709/219 |
| 2013/0091521 | A1* | 4/2013 | Phillips | H04N 21/23424 725/35 |
| 2013/0160047 | A1* | 6/2013 | DuBose | H04N 21/26258 725/32 |
| 2014/0020037 | A1* | 1/2014 | Hybertson | H04N 21/2365 725/109 |
| 2014/0143823 | A1* | 5/2014 | Manchester | H04N 21/2662 725/116 |
| 2014/0282777 | A1* | 9/2014 | Gonder | H04L 65/612 725/116 |
| 2014/0282784 | A1* | 9/2014 | Pfeffer | H04N 21/8586 725/112 |
| 2017/0237777 | A1 | 8/2017 | Joch et al. | |
| 2019/0037270 | A1 | 1/2019 | Arpirez Vega et al. | |
| 2019/0230010 | A1 | 7/2019 | Guo et al. | |
| 2021/0400347 | A1* | 12/2021 | Puente Pestaña | H04N 21/23805 |

OTHER PUBLICATIONS

Ericsson Mobility Report, Jun. 2019, 36 pages.
Pan et al., "QoE Assessment of Encrypted YouTube Adaptive Streaming for Energy Saving in Smart Cities", IEEE Access, Mar. 9, 2018, pp. 25142-25156, vol. 6.
Bronzino et al., "Inferring Streaming Video Quality from Encrypted Traffic Practical Models and Deployment Experience", Proceedings of the ACM on Measurement and Analysis of Computing Systems, Dec. 2019, vol. 3, No. 3, 25 pages.
Bronzino et al., "Lightweight, General Inference of Streaming Video Quality from Encrypted Traffic", arXiv.org, Jan. 17, 2019, pp. 1-13.
Wassermann et al., "I See What You See: Real Time Prediction of Video Quality from Encrypted Streaming Traffic" 4th ACM MOBICOM Workshop on QoE-based Analysis and Management of Data Communication Networks, 2019, 7 pages.
Wassermann et al., "Let me Decrypt your Beauty: Real-time Prediction of Video Resolution and Bitrate for Encrypted Video Streaming", Demonstrations of the Network Traffic Measurement and Analysis Conference (TMA), Jun. 2019, 3 pages.

* cited by examiner

ESTIMATING VIDEO RESOLUTION DELIVERED BY AN ENCRYPTED VIDEO STREAM

CROSS REFERENCE TO RELATED APPLICATION(S)

This application is a 35 U.S.C. § 371 National Phase Entry Application from PCT/EP2020/073869, filed Aug. 26, 2020, designating the United States, which claims the benefit of International Application No. PCT/EP2020/073124, filed Aug. 18, 2020, the disclosures of which are incorporated herein by reference in their entirety.

TECHNICAL FIELD

This disclosure relates to a method for estimating a level of video resolution being delivered by an encrypted video stream, to a network node or group of network nodes and to a computer program.

BACKGROUND

Communication of video makes up by far the largest proportion of data traffic carried over the Internet, and the proportion is increasing. Furthermore, almost all video data is encrypted.

The volume of video data being communicated to user devices over mobile communications networks is predicted to grow by more than 30 percent annually in the next five years. This is due to the increasing number of video-capable 'smart' devices in use. It has been estimated that by the year 2024 nearly three-quarters of total mobile data traffic will comprise video data traffic. In addition, the significant improvement in mobile network performance expected to be available through the upgrade to 5G will open the way for immersive media technologies such as 360-degree video streaming and augmented/virtual reality applications, further contributing to this rapid growth in video data traffic.

Even though video streaming is considered to be the dominant service of today's Internet in terms of data volume, the analysis and management of such traffic are becoming increasingly difficult due to the fast spreading of transport-level encryption. Transport-level encryption is expected to intensify in the coming years. The proportion of total data traffic that is encrypted has already reached 80 percent globally. This poses a great challenge for Mobile Network Operators (MNOs) and other network operators aiming, by appropriate monitoring of data traffic being carried over their networks, to provide and maintain the best possible service quality for their customers.

From a technical point of view, the main driver behind this trend for encryption has been the advent of new protocols which put more focus on security and privacy aspects, by design, than ever before. For example, the recently introduced TLS (Transport Layer Security) 1.3 offers enhanced security features over its predecessors, such as forward secrecy and encrypted handshakes. Large-scale deployment has already begun. As another example, the emerging QUIC (Quick UDP Internet Connections) protocol, originally developed by Google Inc., represents a significant step towards Internet-wide encryption as it inherently encrypts all the data at the transport layer. The standardization of QUIC is underway, and its first official version will soon be released, leaving only a few options for performance measurement and troubleshooting by monitoring of data packets.

Currently, to measure the Quality of Experience (QoE) of playout of video at a client device, MNOs typically use passive probes in their network to collect packet-level information from which to calculate meaningful metrics for various types of network traffic.

There are several well-defined Key Performance Indicators (KPIs) for describing user-perceived video playout quality. For example, initial buffering time, stall time (ratio) and video resolution are all shown to affect Mean Opinion Score (MOS), an industry-standard metric commonly used for QoE assessment. Variations in achieved video resolution-based KPIs are shown to have the biggest influence on user experience. However, in order to report these KPIs with high reliability it is vital to have accurate estimates of video resolution.

It is known, for example from Paul Schmitt, Francesco Bronzino, Sara Ayoubi, Guilherme Martins, Renata Teixeira, Nick Feamster, "Inferring Streaming Video Quality from Encrypted Traffic: Practical Models and Deployment Experience", 2019 (available at https://dl.acm.org/doi/pdf/10.1145/3366704), to estimate resolution and other performance measures for encrypted video sessions based on data from three different layers: Network layer, Transport layer and Application layer. In their proposed solution they use machine learning algorithms to estimate the resolution from numerous features. This solution makes a prediction for every 10 second interval in a video session and the most important features are traffic volume-related. A similar approach for resolution estimation is disclosed in Francesco Bronzino, Paul Schmitt, Sara Ayoubi, Nick Feamster, Renata Teixeira, et al., "Lightweight, General Inference of Streaming Video Quality from Encrypted Traffic", 2019 (available at https://hal.inria.fr/hal-02074823/file/1901.05800.pdf) and in Sarah Wassermann, Michael Seufert, Pedro Casas, Li Gang, Kuang Li, "Let me Decrypt your Beauty: Real-time Prediction of Video Resolution and Bitrate for Encrypted Video Streaming", Demonstrations of the Network Traffic Measurement and Analysis Conference (TMA), June 2019, Paris, France (available at https://www.researchgate.net/publication/335419420_I_See_What_you_See_Real_Time_Prediction_of_Video_Quality_from_Encrypted_Streaming_Traffic).

It is also known, for example from Wassermann, Sarah & Seufert, Michael & Casas, Pedro & Gang, Li & Li, Kuang, "I See What you See: Real Time Prediction of Video Quality from Encrypted Streaming Traffic" (2019) to use one second time slots to partition video sessions. For each time slot, a resolution estimate is made using features calculated from that timeslot, aggregated features from the preceding three time slots, and aggregated features from the whole session.

It is also known, for example from published US patent application US 2019/0037270 A1, to extract features for resolution estimation using network data and protocol-layer data (HTTP, TCP) and to use these features similarly to the use of determined features in the above-referenced documents.

The inventions discussed in published patent application WO 2019/091591A1 and in U.S. Pat. No. 10,362,081 B2 propose other machine learning based methodologies to estimate QoE metrics from an encrypted video stream.

However, known techniques for inferring the quality of user experience in the playout of video tend not to focus on practical issues. In the case of mobile networks, traffic patterns can be quite different to what might have been assumed. For example, limitations in network resources, e.g. network congestion, fairness strategies implemented by MNOs to protect against subscribers expropriating resources, or simply traffic shaping or agreements between MNOs and ISPs in order to reduce network load, may lead to unexpected restraints being applied on data download by even those subscribers with unlimited data plans.

Many subscribers have limited data plans, forcing ISPs to stream their videos at lower quality levels. However, on small devices such as mobile phones, measures of quality do not necessarily make much difference from the perspective of observed quality, yet efficiently increase the time subscribers may spend consuming their products without introducing additional costs on their side. The net effect is that on mobile networks, the distribution of video resolutions achieved at client devices is skewed towards the lower levels of resolution—the amount of skewness is, however, MNO dependent. While this may not at first appear to be an issue, it is, since it is less easy to distinguish between videos being communicated at the lower levels of resolution by analysis of traffic volumes, as relied upon by a number of the above-referenced techniques. There are several reasons for this.

As one example, the number of pixels in video being communicated with lower traffic volumes is not very different; modern codecs provide surprisingly good compressions and, while naturally having limitations, these are most likely met at lower levels of video resolution. Furthermore, if a video scene has low information content, e.g. it is a dark scene, or there's a large, still background with a few moving objects, then modern codecs compress such scenes dramatically. From this it follows that even a scene of 720p resolution with little information content can become indistinguishable from a 360p video with high information content if relative traffic volumes are being relied upon. An analysis of window-based traffic volume characteristics has been proposed. However, scenes may be much longer than these windows. The windows are not adaptive. Since current literature focuses on an analysis of traffic volumes for predicting resolution, these models become victims of the vanishing explanatory power of such analyses in mobile networks.

Some solutions propose also detecting changes in video bitrate. However, due to the most common average bitrate and variable bitrate encodings of today's standards (and the different information content of scenes) this approach is also expected to yield many false positives.

Another common problem arises from an analysis of TCP protocol messages. Modern solutions, such as Google's QUIC protocol, no longer provide the relied-upon information. As the global focus on encryption increases, this issue becomes more and more relevant in the future.

Many known models were developed and tested using YouTube traffic. However, this inherently includes bias, since YouTube-specific artefacts that are not present in video streams of other service providers and may lead to models being over-confident. For example, when there is a resolution change forced by the subscriber, the YouTube client flushes its buffer and starts refilling it with the selected resolution. This will naturally induce a large burst of traffic, which is quite easy to detect. However, for other service providers, this feature will be meaningless, reducing the performance of the QoE prediction model.

Video clients also tend to avoid resolution ping-pong (when the client switches back and forth between two resolutions) in order to provide a steady quality. However, this conservative approach is not taken into consideration by any of the current solutions.

SUMMARY

According to a first aspect disclosed herein, there is provided a method for estimating playout resolution of a video delivered to a client device by an encrypted video stream communicated over a network. The method comprises, at (i), obtaining a first probability distribution for a plurality of states of a Markov chain, the states comprising a plurality of different levels of playout resolution that may be achieved at the client device by the delivered video stream. The method comprises, at (ii), selecting a current chunk of the encrypted video stream comprising data packets expected to carry video data of the same level of playout resolution. The method comprises, at (iii), by analysis of the data packets in the selected current chunk, determining values for features in a predetermined set of features indicative of conditions in the network. The method comprises, at (iv), using a pre-generated model to obtain, given the determined set of feature values from (iii), a corresponding set of state transition probabilities of the Markov chain. The method comprises, at (v), applying the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

One advantage of examples disclosed herein is that they recognize that video clients are effectively state machines: a video client operating under a given set of network conditions may exhibit differing behavior conditional upon a current buffering resolution. For example, if a video is streamed in 360p resolution and the long-time throughput of the network falls by 200 kbit/s, then it is very likely that the client will have to change to lower resolutions. On the other hand, if the video had been streamed in 1080p resolution, then 200 kbit/s is a marginal change compared to the throughput that is required to maintain such a video, hence the client would continue without a resolution decrease. The examples disclosed herein take account of this behavior.

Video clients tend to avoid drastic changes in resolution: if network conditions degrade, they most likely decrease resolution in a step-by-step manner instead of falling to low resolutions immediately. The use of Markov chains in the present disclosed methods naturally avoids sudden reactions to changing network conditions. The method thereby determines the effect of changing network conditions on delivered video resolution in a way that is more consistent with the actual behavior of client devices than may be achieved in prior art techniques.

A further advantage of examples disclosed herein is that they provide models that enable a time-varying measure of uncertainty to be determined in estimates of a level of video resolution being achieved at a client device. Known models simply provide single resolution estimates as outputs at each time step. When attempting to derive Key Performance Indicators (KPIs) based upon changes in the achieved level of resolution, it is beneficial to determine a level of uncertainty in decisions used to make the calculation because models do not provide predictions with 100% certainty. For example, there may be a case when resolution A has probability 50%, while resolution B has probability 45% and resolution C has 5%. It can be seen clearly that there is a very large uncertainty about the estimates. Simply choosing resolution A is risky. This issue is especially important for mobile networks, where MNOs wish to have the best possible KPIs in order to measure QoE of their subscribers. Example methods disclosed herein are more able to distinguish QoE for subscribers receiving video at the lower levels of resolution than may be achieved by the prior art approach of relying upon traffic volume-related features.

Examples disclosed herein provide more accurate estimates for video resolution, so making it possible to derive end-to-end KPIs that correctly capture user perceived performance from encrypted video data streams.

Examples disclosed herein avoid incorporating features that capture a particular service provider's behavior or which rely on protocol messages like those of TCP that may cease to exist in the near future. Thus, the proposed examples are both service provider and transport protocol-agnostic.

Introducing state-machine based handling of resolution estimation improves the accuracy of the estimation of the example methods disclosed herein dramatically, as compared to current state-of-the art techniques that do not apply this novel approach.

According to a second aspect disclosed herein, there is provided a network node, or a group of nodes, of a network, configured with access to data packets carrying an encrypted video stream being communicated through the network. The network node, or group of nodes, is configured to estimate playout resolution of a video delivered to a client device by the encrypted video stream. To achieve this, the network node, or group of nodes, is configured, at (i), to obtain a first probability distribution for a plurality of states of a Markov chain, the states comprising a plurality of different levels of playout resolution that may be achieved at the client device by the delivered video stream. The network node, or group of nodes, is configured, at (ii), to select a current chunk of the encrypted video stream comprising data packets expected to carry video data of the same level of playout resolution. The network node, or group of nodes, is configured, at (iii), by analysis of the data packets in the selected current chunk, to determine values for features in a predetermined set of features indicative of conditions in the network. The network node, or group of nodes, is configured, at (iv), to use a pre-generated model to obtain, given the determined set of feature values from (iii), a corresponding set of state transition probabilities of the Markov chain. The network node, or group of nodes, is configured, at (v), to apply the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

According to a third aspect disclosed herein, there is provided a cloud-hosted data processing environment. The cloud-hosted data processing environment is configured to implement a physical or virtualized functional node having an interface for receiving, from a network node as disclosed herein, values for features in a predetermined set of features indicative of conditions in a network. The functional node is configured with access to a pre-generated model that relates, with a probability determined by reference to a training data set, a first of a plurality of levels of resolution of a video, as may be delivered to a client device over the network, to a second of the plurality of levels of resolution of the video as may be delivered to the client device as a result of network conditions indicated by a respective combination of values for the set of features. The functional node is configured to obtain from the model, for the received combination of values for the set of features, a set of conditional state transition probabilities for the possible transitions from a first of the plurality of levels of resolution to a second of the plurality of levels of resolution, under network conditions indicated by the received combination of values for the set of features. The functional node then outputs the obtained set of conditional state transition probabilities at the interface.

According to a fourth aspect disclosed herein, there is provided a computer program which, when loaded into and executed by a processor, causes the processor to implement the method according to the first aspect disclosed herein.

According to a fifth aspect disclosed herein, there is provided a data carrier having stored thereon computer-readable instructions which, when downloaded and executed by a computer, cause the computer to implement the method according to the first aspect disclosed herein.

According to a sixth aspect disclosed herein, there is provided a computer program product comprising a data carrier or a device for accessing a data carrier having stored thereon computer-readable instructions which, when downloaded and executed by a computer, cause the computer to implement the method according to the first aspect disclosed herein.

According to a seventh aspect disclosed herein, there is provided a network node, comprising a processor and a memory. The memory stores instructions executable by the processor thereby to configure the network node to access data packets carrying an encrypted video stream being communicated through the network and to estimate playout resolution of a video delivered to a client device by the encrypted video stream. The network node is configured to estimate playout resolution of the video by, at (i), obtaining a first probability distribution for a plurality of states of a Markov chain, the states comprising a plurality of different levels of playout resolution that may be achieved at the client device by the delivered video stream. At (ii), the network node selects a current chunk of the encrypted video stream comprising data packets expected to carry video data of the same level of playout resolution. At (iii), by analysis of the data packets in the selected current chunk, the network node determines values for features in a predetermined set of features indicative of conditions in the network. At (iv), using a pre-generated model, the network node obtains, given the determined set of feature values from (iii), a corresponding set of state transition probabilities of the Markov chain. At (v), the network node applies the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

BRIEF DESCRIPTION OF THE DRAWINGS

Examples of the proposed technology will now be described in more detail and with reference to the accompanying drawings of which.

DETAILED DESCRIPTION

Figure 1:
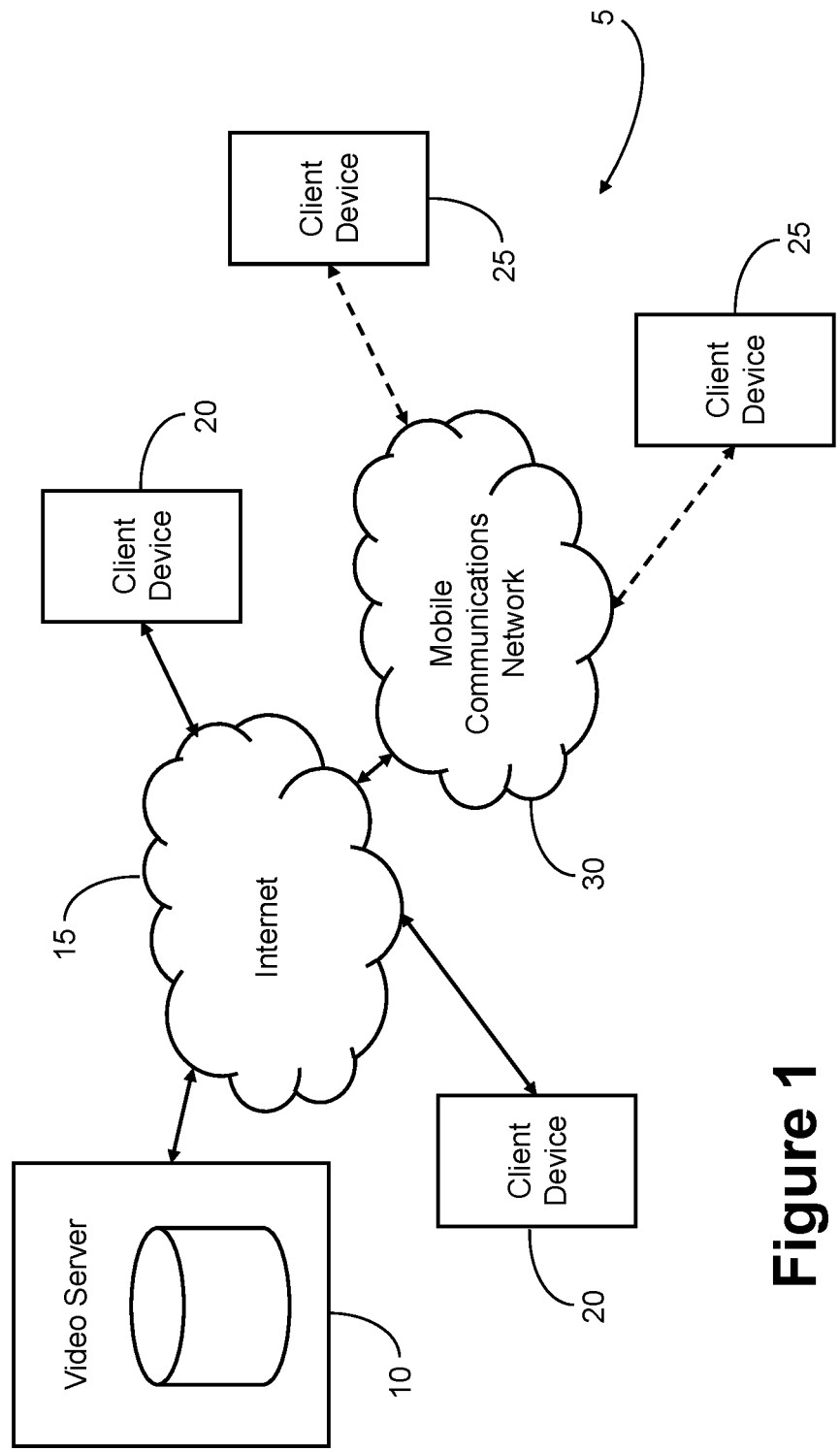
FIG. 1 shows a typical video streaming arrangement in which examples disclosed herein may be implemented.

This detailed description provides specific details of inventive concepts for the purpose of explanation but not limitation. It will be appreciated by one skilled in the art that variations in the examples described may be employed, apart from these specifically described. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g. analogue and/or discrete logic gates interconnected to perform a specialized function, ASICs, PLAs, etc.) and/or using computer programs and data in conjunction with one or more digital microprocessors or general purpose computers that are specially arranged and configured to carry out the processing disclosed herein. Nodes that communicate wirelessly may include radio communications circuitry compliant with a relevant short range or mobile communications radio standard. Moreover, the technology described herein may be considered to be embodied entirely within any form of computer-readable memory, such as solid-state memory, magnetic disk, or optical disk containing an appropriate set of computer instructions that would cause a processor to carry out the methods and functions described herein.

Hardware implementations may include or encompass, without limitation, digital signal processor (DSP) hardware, a reduced instruction set processor, hardware (e.g. digital or analogue) circuitry including but not limited to application specific integrated circuit(s) (ASIC) and/or field programmable gate array(s) (FPGA(s)), and (where appropriate) state machines capable of performing such functions.

In terms of computer implementations, a computer is generally understood to comprise one or more processors, one or more processing modules or one or more controllers, and the terms computer, processor, processing module and controller may be employed interchangeably. When provided by a computer, processor, or controller, the functions described herein may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Video and other multi-media content providers aim to deliver content at a high availability and high performance to their customers, despite bandwidth limitations in communication networks that interconnect them. Network operators also have an interest in ensuring that the networks they operate are able to support the levels of data traffic expected by their users. Network operators employ various techniques to monitor the use of their networks and to anticipate or respond to varying demand for data communications resources.

Responsibility for satisfying demand for data communications, in particular by media delivery applications often requiring a high average communications bandwidth, may be devolved to some extent by the provision of Content Delivery Networks (CDNs). A Content Delivery Network (CDN) may comprise a large distributed system of servers deployed in multiple data centers connected to the Internet or other public/private communication network. The goal of a CDN is to serve media content (e.g. video, audio, etc.) to User Equipment (UE) with high availability and high performance. The benefits of CDNs are intended to include delivery of media content to nodes that are more local, in terms of network connectivity, to the UE likely to require download of such content. For example, a CDN may include so-called 'edge' servers linked to a mobile communications network, configured to apply various algorithms to the download of content from central CDN servers or original content providers, anticipating or responding to the demands of local UE users for such content. Users of the mobile communications network, in this example, are likely to have access to higher bandwidth communications channels to the respective edge server than might be available in an end-to-end communications channel to a source of the content, such as a video service provider's server, and with potentially greater availability.

The bandwidth requirements for distributing content from content providers to central CDN servers, to distributed edge servers, or directly to UE devices executing client applications, have grown tremendously with the proliferation of adaptive content streaming solutions. Adaptive streaming technology is being implemented to handle increasing consumer demands for the streaming of content, in particular multimedia content from content servers of broadcast and on-demand movie/TV providers. Example adaptive streaming technology that continues to be developed includes Apple® initiated HTTP Live Streaming (HLS) protocol, Microsoft® initiated Smooth Streaming (SS) over HTTP protocol, Adobe® initiated Dynamic Streaming protocol, and MPEG Dynamic Adaptive Streaming over HTTP (MPEG DASH) protocol.

Adaptive streaming technology converts a source media content stream into a plurality of content streams having different coding bit rates. A group of multiple bit rate content streams may be transcoded to provide a plurality of groups of multiple bit rate content streams having different distribution container formats, as may be required by different streaming protocols (e.g., HLS protocol, Smooth Streaming protocol, Dynamic Streaming protocol, MPEG DASH protocol, etc.). Accordingly, a single group of multiple bitrate content streams can result in numerous groups of differently formatted multiple bit rate content streams that need to be distributed and stored at a central CDN server and/or distributed to Edge replication servers, or directly to UE clients to enable high availability and high performance delivery.

An example adaptive streaming server system may be configured to accept media content from live sources and/or static file sources, e.g. online content providers such as Hulu®, Netflix®, YouTube®, or Amazon® Prime, etc. Media content from live sources may comprise live programming captured for any type of event, e.g., sporting/entertainment/gaming events, concerts, live TV shows, live news broadcasting, etc.

As used herein, a network element or node may comprise of one or more pieces of service network equipment, including hardware and software that communicatively interconnects other equipment on a network (e.g., other network elements, end stations, etc.), and is configured to host one or more applications or services with respect to one or more subscribers. As such, some network elements may be disposed in a wireless/wireline telecommunications network or a cable provider network. Other network elements may be disposed in a public packet-switched network infrastructure (e.g. the Internet), private packet-switched network infrastructures such as Intranets and enterprise networks, as well as service provider network infrastructures, any of which may span or involve a variety of access networks and core networks in a hierarchical arrangement. Where digital content or assets are consumed by the subscribers, network elements hosting such digital content or assets may be disposed in suitable CDN infrastructures. Accordingly, some network elements may comprise "multiple services network elements" that provide support for multiple network-based functions.

In general, the terms "content" or "content file" as used in reference to at least some embodiments of the present disclosure may include digital assets and program assets such as any type of audio/video (A/V) content or program segment, live streaming or static (e.g., recorded over-the-air free network TV shows or programs, pay TV broadcast programs via cable networks or satellite networks, free-to-air satellite TV shows, IPTV programs, etc.), OTT and VOD or Movie-on-Demand (MOD) shows or programs, time-shifted TV (TSTV) content, locally stored content or network-stored content, as well as other content assets provided by content publishers, owners or providers, including but not limited to software files, executable computer code or programs, online electronic games, Internet radio shows/programs, entertainment programs, educational programs, movies, music video programs, and the like. Further, the content may be delivered, received or provided to the UE devices using broadcast cable TV, local TV, switched digital video (SDV) TV, satellite TV, broadband Internet, via one or more ABR streaming technologies. Example subscriber end stations or client devices may comprise any device configured to execute, inter alia, a streaming client application (e.g. an ABR streaming client application) for receiving content from one or more content providers, e.g. via a broadband access network, or CDN. Such client devices may therefore include set-top boxes (STBs), TVs, personal/digital video recorders (PVR/DVRs), networked media projectors, portable laptops, netbooks, palm tops, tablets, smartphones, video phones, mobile/wireless user equipment, portable media players, portable gaming systems or consoles (such as the Wii®, Play Station 3®, etc.) and the like that may access or consume content/services provided via a suitable dynamic packager network architecture for purposes of one or more embodiments set forth herein.

One or more examples described herein may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signalling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

A typical example arrangement in which live or recorded video may be streamed from a source to a client device for viewing by a user will firstly be described with reference to FIG. 1.

Referring to FIG. 1, in an example arrangement 5, a video server 10 is linked to a network such as the Internet 15. The video server 10 may for example be an original content server operated by a video service provider offering video content on demand. Alternatively, or in addition, the video server 10 may be an 'edge' server in a CDN from which such video content may be delivered to subscribers. Subscribers may operate client devices 20, configured to communicate with the video server 10 over the Internet 15, or a respective local access network of an Internet service provider or other communications service provider. Typically, the client devices 20 communicate with the video server 10 using HTTP to request and download video content. Other subscribers may operate client devices 25 linked wirelessly to a mobile communications network 30 operated by a mobile network operator (MNO) such that they may communicate with the video server 10 using the same HTTP messages, sent via both the mobile communications network 30 and the Internet 15. If edge servers of a CDN are deployed in the mobile communications network 30, then the client devices 25 may obtain requested video content from such an edge server, whether or not they are aware that the content is being delivered via such a server.

The client device 20, 25 may comprise a UE or any other known computing device having a communications interface appropriate to the type of network to which it is required to connect so that it may communicate with the video server 10. Typical examples of components making up a client device 20, 25 are shown in FIGS. 2a and 2b.

Figure 2B:
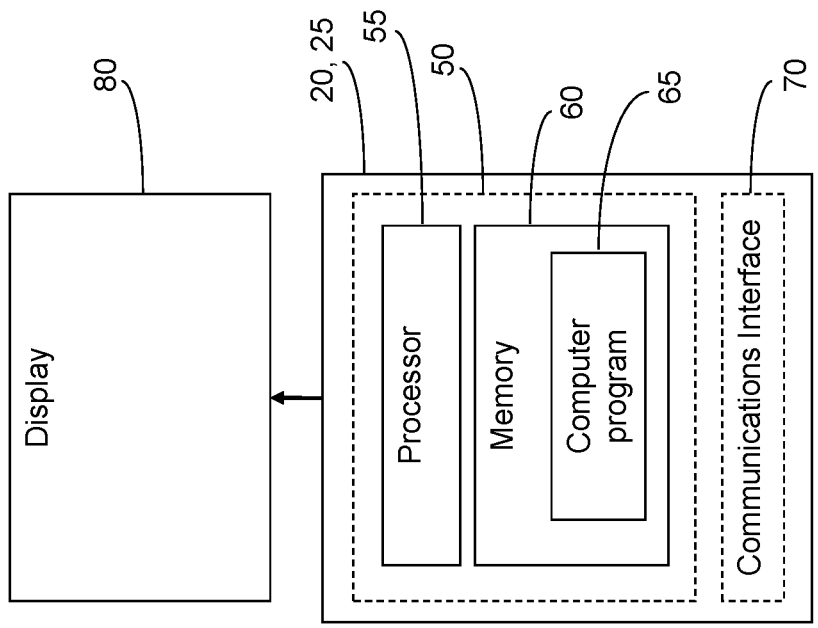
FIG. 2b shows two example schematic representations of components of a client device as may be used to receive a video stream communicated over the arrangement shown in FIG. 1.
Figure 2A:
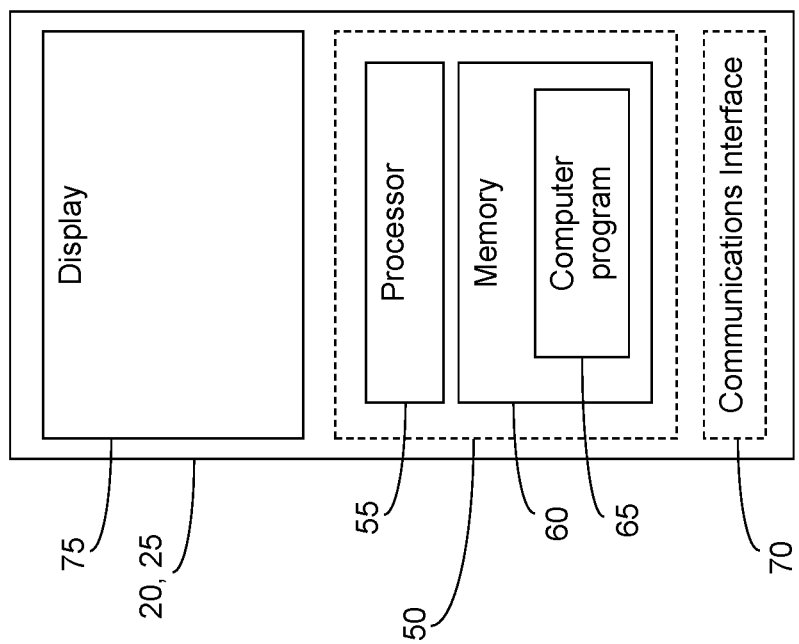
FIG. 2a shows two example schematic representations of components of a client device as may be used to receive a video stream communicated over the arrangement shown in FIG. 1.

Referring to FIGS. 2a and 2b, a client device 20, 25 may comprise a data processing component 50 that includes a processor 55 and an associated memory 60. The memory may store, besides other data, one or more computer programs 65. When the one or more computer programs 65 are executed by the processor 55, the client device 20, 25 is configured to request and download encrypted video content via a communications interface 70 and to decode the content for display to a user of the device. In the example shown in FIG. 2a, a display 75 is integrated within the device, as for example where the client device 20, 25 is a smart phone, a tablet computer, a laptop computer, a vehicle, etc. In the example shown in FIG. 2b, a display 80 may be provided that is separate from the client device 20, 25, as for example where the client device 20, 25 is a set-top box, a gaming console, or a personal computer (PC) having a separate display device, etc. In general, the client device 20, 25 may comprise, but is not limited to: a mobile phone, a smart phone, a sensor device, a vehicle, a household appliance, a medical appliance, a media player, a camera, or any type of consumer electronic, for instance, but not limited to, a television, a set-top box, dedicated gaming console, a radio, tablet computer, laptop, or personal computer (PC). The client device 20, 25 may be a portable, pocket-storable, hand-held, or vehicle-mounted mobile device, enabled by an appropriate communications interface 70 to communicate voice and/or data, via a wireless or wireline connection.

Where video data are being communicated over HTTP networks, such as the Internet 15, it is common to implement known Adaptive Bitrate (ABR) streaming functionality, of one or more of the types indicated above, at a client device 20, 25 and a video service provider's server 10. One example of an HTTP-based ABR streaming protocol is MPEG-DASH, published as ISO/IEC 23009-1:2019. Typically, when video data are to be streamed using ABR streaming protocols, video source content is encoded at multiple different bitrates and as a stream of segments, each segment carrying a portion of video of a predetermined time duration, e.g. of up to 10 seconds, which may vary in length in different implementations. A manifest file or other description of the available encoded segments is generated and stored at a server 10. This is then available to be downloaded by a client device 20, 25. The manifest file indicates the level of resolution, or quality of each available segment and, if necessary, an indication of where the segment is stored so that the client device 20, 25 may select an appropriate segment and download it. The client device 20, 25 downloads a most recent manifest file and selects an encoding of a segment of a quality appropriate to the network conditions it is able to detect at that time, or according to resources available at the client device 20, 25. For example, if the client device 20, 25 detects that the network throughput changes, for example by analysis of network throughput achieved for recently downloaded segments, or by its buffer content, it may request a higher or lower quality encoding of a segment, selected from those indicated as being available in the most recent manifest file. Segments encoded at a higher quality generally comprise more data and need to be communicated over a higher bandwidth channel. Where network conditions deteriorate, the client may respond by requesting a lower quality encoding of a segment, requiring a lower network bandwidth, which would result in a reduction in the level of playout resolution of the streamed video experienced by a user of the client device 20, 25.

Where video data streams are not encrypted, a network operator, for example a mobile network operator (MNO) of the network 30, may determine the level of resolution of video in a video stream being carried in data packets to a client device 25 over its network 30. For example, if the video stream is not encrypted, the MNO may see what video segments a client device 25 is requesting, and from which URL. In one possible method, the MNO may itself download a respective manifest file and see, by matching the URLs in client requests with entries in the manifest file, the level of resolution of the requested segments. In another possible method, it may be that the naming of the URL in a client request message directly indicates the level of resolution of a segment being requested. However, when the video data stream is encrypted, it is no longer possible for the MNO to determine any properties of the encrypted video stream.

It may be that, even in situations when the video stream is not encrypted, it is beneficial for a network operator to use the methods disclosed herein to determine the level of resolution of streamed video being experienced by a user of a client device 20, 25. It may be more difficult and costly in data processing resources for a network operator to try to monitor all video downloads by numerous users, even if not encrypted, for example by requesting, storing and analyzing manifest files, than to use the methods disclosed herein instead. The methods disclosed herein are also therefore intended to be used with video streams that are not encrypted.

As indicated above, encryption of communicated content over the Internet is becoming increasingly common. One commonly used encryption technique is Transport Layer Security (TLS). For the purpose of describing example embodiments herein, it will be assumed that a network operator is unable to decrypt encrypted video content being communicated over their network. However, in some implementations, it may be arranged that some parts of messages being communicated between a server and a client device may be read by a network operator. It may be that, even in those situations, the information that can be observed is insufficient for the network operator to be able to determine the level of resolution of communicated video content or buffering resolution at the client device 20, 25 directly.

One example method that may be implemented in examples disclosed herein will now be described with reference to FIG. 3. For simplicity, the detailed description of the method that follows focuses on a single video stream for a single user, e.g. video streaming subscriber. However, it will be understood that the method may be implemented in several parallel data processing threads, each processing the same or a different video stream in respect of one or more different users, or one or more different times.

The method is based upon an inventive realization that the way in which the level of video buffering resolution varies at a client device 20,25 may be modelled as a state machine. That is, the way in which the states, the different levels of video playout resolution provided by the video streaming protocol being used, evolve over time may be determined by applying a time-varying Markov chain. The Markov chain is defined by time-varying transition probabilities determined by modelling the effects of particular network conditions on resolution transitions at a client device 20, 25. In particular, in another innovation disclosed herein, the transition probabilities may be applied to determine how a probability distribution ret of the different levels of video resolution (states) evolve over time. This has the benefit that more accurate statistical measures may be determined, not available in prior art methods, of the quality of experience (QoE) of a user when an encrypted video stream is exposed to a wide range of different network conditions.

In a further innovation, accepting that it is not possible to infer a level of video resolution directly by observation of an encrypted video stream, a set of features has been devised that are measurable and that enable an accurate estimate to be made of network conditions likely to influence a decision by a client/server combination to vary the level of resolution of a communicated video. Furthermore, an innovative modelling technique has been devised to relate the features indicating respective network conditions with the probabilities that they affect video resolution at a client device 20, 25, so providing corresponding time-varying state transition probabilities that determine the evolution of states of the Markov chain.

Figure 3:
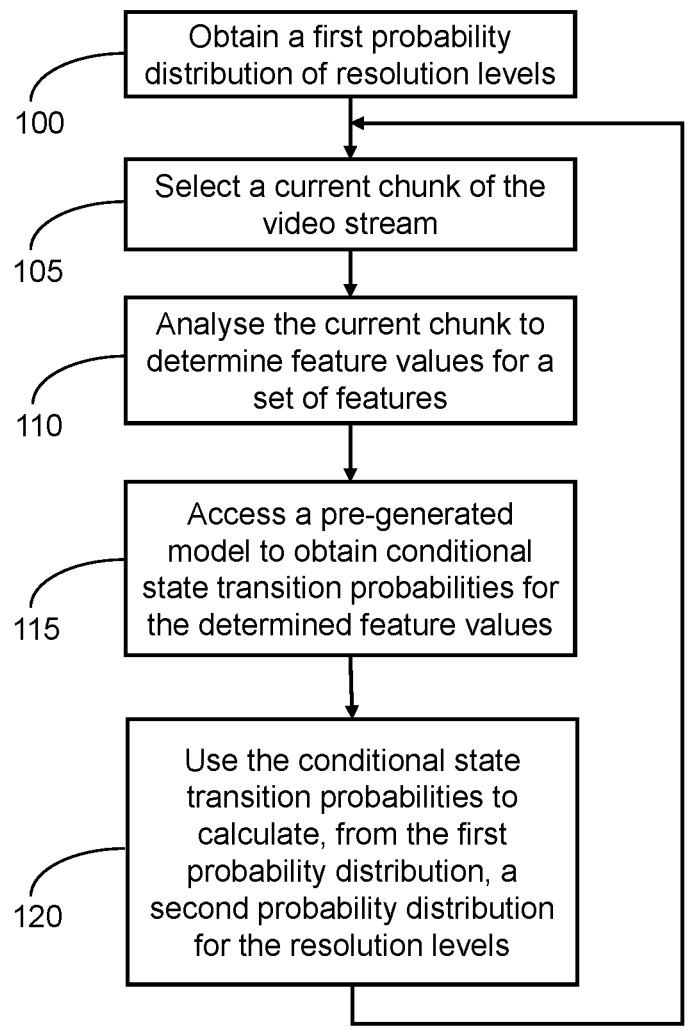
FIG. 3 is a flow diagram showing features of an example method disclosed herein.

Referring to FIG. 3, a flow chart is provided, in one example, for inferring the likelihood that any one of a number of possible levels of video resolution may be experienced by a user at a client device 20, 25 receiving an encrypted video stream. The method begins at 100 by obtaining a first probability distribution for the different possible levels of video resolution (states) at a client device 20, 25 in the form of a vector $\pi_t$ of resolution probabilities at a time t. The time t may be a current time, or a time in the (preferably recent) past. A typical video streaming protocol will support a number of different possible levels of resolution for video frames. In one typical example, video frames may be encoded and communicated at one or more of four possible levels:

Medium—640×320 pixels;
High—960×540 pixels;
HD 720—1280×720 pixels;
HD 1080—1920×1080 pixels.

In this example, these four resolution levels are the states of the Markov chain, assuming that one of these levels of resolution has been, is being, or will be experienced by a user of a client device 20, 25 viewing the streamed video. The first probability distribution obtained at 100 provides a first set of probabilities $\pi_t$ for the states of the Markov chain. There are various ways in which this first probability distribution may be "obtained", as will be discussed for examples below.

At 105, the method moves to selecting a so-called 'chunk' of the video stream. One example of a principle being applied in this method to the selecting of a chunk is that data packets selected for the chunk are expected to carry video content of the same level of resolution. That is, the chunk is expected to represent a period of time during which there has been no adjustment by a client/server to the quality of the video content due to a change in network conditions. The chunk may be selected approximately in real time from data packets as they are being communicated. Alternatively, the chunk may be selected from data packets that have already been communicated and have been buffered or otherwise stored temporarily.

It may be known that for a particular video server 10 implementing a particular video streaming protocol, the encoding method used to encode the video content necessarily involves encoding video content into multiple segments. Each segment comprises a portion of video of a fixed playing time, e.g. a duration of 10 seconds, and each segment may be encoded at multiple different bit rates, each bit rate representing video content of a respective level of resolution. However, when the video content is encrypted, it is no longer possible directly to determine segment boundaries, or to select a number of data packets known to carry, for example, 10 seconds of video content, or to know directly the bit rate of the video stream, or to infer the resolution of the video content being carried in the encrypted packets.

Modern client devices 20, 25 implementing DASH-like streaming protocols download data in chunks in a quasi-periodic manner. Chunks are logical units within which video characteristics are more similar. For this reason, a chunk-based approach is favored. Chunks are related to traffic via bursts—a burst is a torrent of packets, generated by downloading a given chunk. In order to be able to implement a robust, reliable and accurate resolution estimation method, a node or network function may be provided that is able to divide the data packets of a video stream into chunks. There are several methods proposed in the academic literature on this topic as would be known to a person of ordinary skill in the relevant art. One such method is described for example in co-pending patent application number PCT/SE2020/050618 by the present Applicant. Any other similar method known to a person of ordinary skill in the relevant art may be selected for use in implementing this part 105 of the method, given the aim of selecting a chunk carrying video content of a single level of resolution.

In examples disclosed herein, the filtering of data packets of the video stream into chunks at 105 may be achieved by applying one or more of the following constraints when selecting packets of a chunk:

the packets relate to a particular video streaming session between a particular video service provider and a particular client device;
the packets are expected to be carrying video content having a single level of resolution;
the packets have a payload size that is above a predetermined threshold size; and
the packets can be identified as uplink packets or downlink packets.

In one example embodiment, a chunk is selected comprising only uplink and downlink data packets with a payload size above a certain threshold and relating to a particular video session between a given subscriber and a video service provider. The reason for the size threshold is that protocol control messages should be filtered out, focusing only on packets that contain relevant video content. In the case of TCP data packets, protocol control packets may be trivially filtered. However, for fully encrypted protocols, such as Google Inc's QUIC, it is desirable to implement step 105 of the method using functionality that is able to achieve this filtering step for data packets of any expected type of encrypted video stream.

This part 105 of the method may be implemented at a node or network function within the end-to-end network path from a video server 10 to a client device 20,25 from where the video stream may be accessed. Example nodes or network functions from where the selection at 105 may be implemented will be discussed below.

The method then moves on, at 110, to analyze the selected current chunk from 105 to determine values θ(t) for a predetermined set of features, wherein the time t indicates a time at which the 'current' chunk is being, or was, communicated. The set of features has been selected to include features whose values θ(t) may be determined by analysis of the encrypted video stream and which have been found to provide a more reliable indication of network conditions or network behavior than, for example, traffic patterns, as used in the above-referenced prior art. Analysis of the selected current chunk at 110 is implemented, ideally, from where a realistic indication of end-to-end network conditions may be obtained.

As indicated above, the 'current' chunk may be selected approximately in real time from the video stream so that the time t indicates approximately the current time (allowing for any latency in filtering the packets that will comprise the chunk). Alternatively, the data packets that are selected to form the 'current' chunk may have been communicated some (preferably small) time in the past and are being analyzed at some time later than the time t to determine the feature values θ(t).

One example set of features according to the present disclosure includes (but is not limited to):
burst inter-arrival time, i.e. the time between arrival of the first packet of a current chunk, or 'burst', and the last packet of the preceding chunk, or 'burst'; and
anomalies in GET request sizes.

The set of features may also include one or more features that are used in known methods, so that the set of features may include one or both of the above two features in combination with the one or more known features. The one or more known features may, for example, be selected from:
an average estimated bitrate of the video stream; and
an average estimated throughput of the communications channel.

An example of how burst inter-arrival time varies with network conditions will now be illustrated with reference to FIG. 4.

Figure 4:
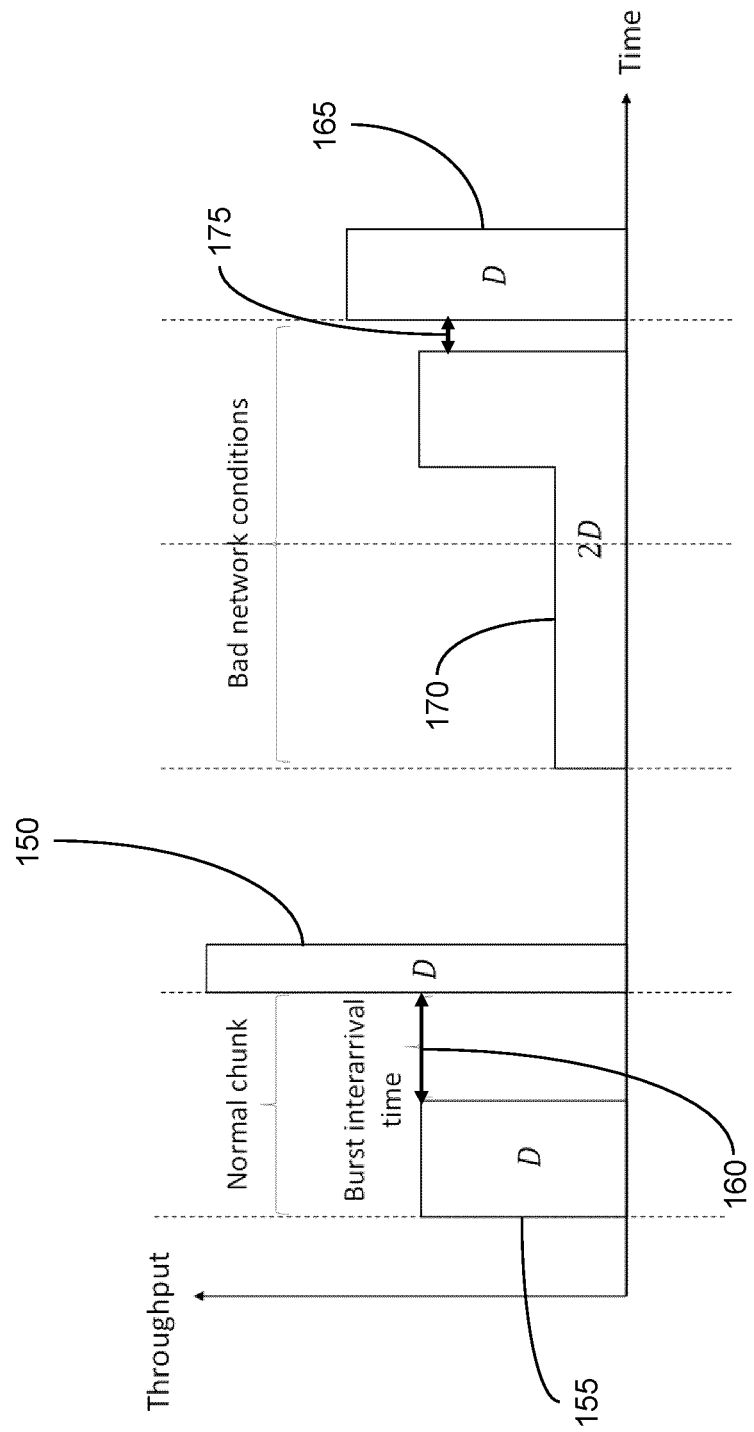
FIG. 4 shows two graphs illustrating the effect on burst inter-arrival time of bad network conditions.

Referring to FIG. 4, a simplified illustration is provided of the quasi-periodic behavior of video clients. As can be seen in FIG. 4, burst inter-arrival time is the time passed between the arrival of the first packet of a current chunk (burst) 150, and the last packet of the preceding chunk (burst) 155. When network conditions are sufficient, as for the chunks 150, 155, the burst inter-arrival time 160 may be observed to be large. However, as network conditions worsen, as shown for a current chunk 165 and a preceding chunk 170, the burst inter-arrival time 175 may be observed to decrease, reaching zero in extreme cases. That is, the chunk 170 carrying encrypted video content of a duration D may be observed to require a longer time period to reach a client device 20, 25 when network conditions worsen. This therefore leaves a shorter time period, the burst inter-arrival time 175, to the next chunk 165 than is available when the chunk 155 of similar video duration is communicated during sufficient network conditions.

As regards the analysis of GET requests, modern streaming protocols use various types of content descriptor file that can be queried to obtain exact URLs of subsequent segments at different resolutions. During steady network conditions, client devices 20, 25 may be observed to send (partial) GET requests with similar URLs, most likely having almost the same size (or alternating sizes for video and audio content). However, when a resolution change becomes necessary, the client device 20, 25 may first query the content descriptor, resulting in a sudden spike (most likely a drop) in request size. This is one potential anomaly that may be observed. Furthermore, the same chunk may have a different video hash for different resolutions, or the same hash but with different parameters in the URL, which may also result in a sudden change in request size. This may occur, for example if, for a given video, the URL of each of the segments being requested includes a video identifier that is the same for every requested segment, regardless of the level of resolution of the segment. Alternatively, the URL for each requested segment of the same video, but of a different level of resolution, includes a different video identifier.

An important factor when attempting to infer network conditions is the buffering resolution at the client device since, as pointed out above, client behavior may depend on what is being currently downloaded. For example, a drop in network throughput may affect different resolutions differently. A video that is already streamed in 360p resolution may be affected more severely by a drop of 200 kbit/s than a video that is streamed in 1080p resolution. Therefore, although the buffering resolution at the client device is not known, the different possible buffering resolutions that may currently exist at a client device need to be considered, effectively as one of the features in the set of features, in combination with determined values θ(t) for the set of features.

The method then moves on, at 115, to access a pre-generated model to obtain state transition probabilities that correspond to the values θ(t) determined for the set of features. The principles on which one proposed example of a pre-generated model operates may be understood with reference to FIG. 5.

Figure 5:
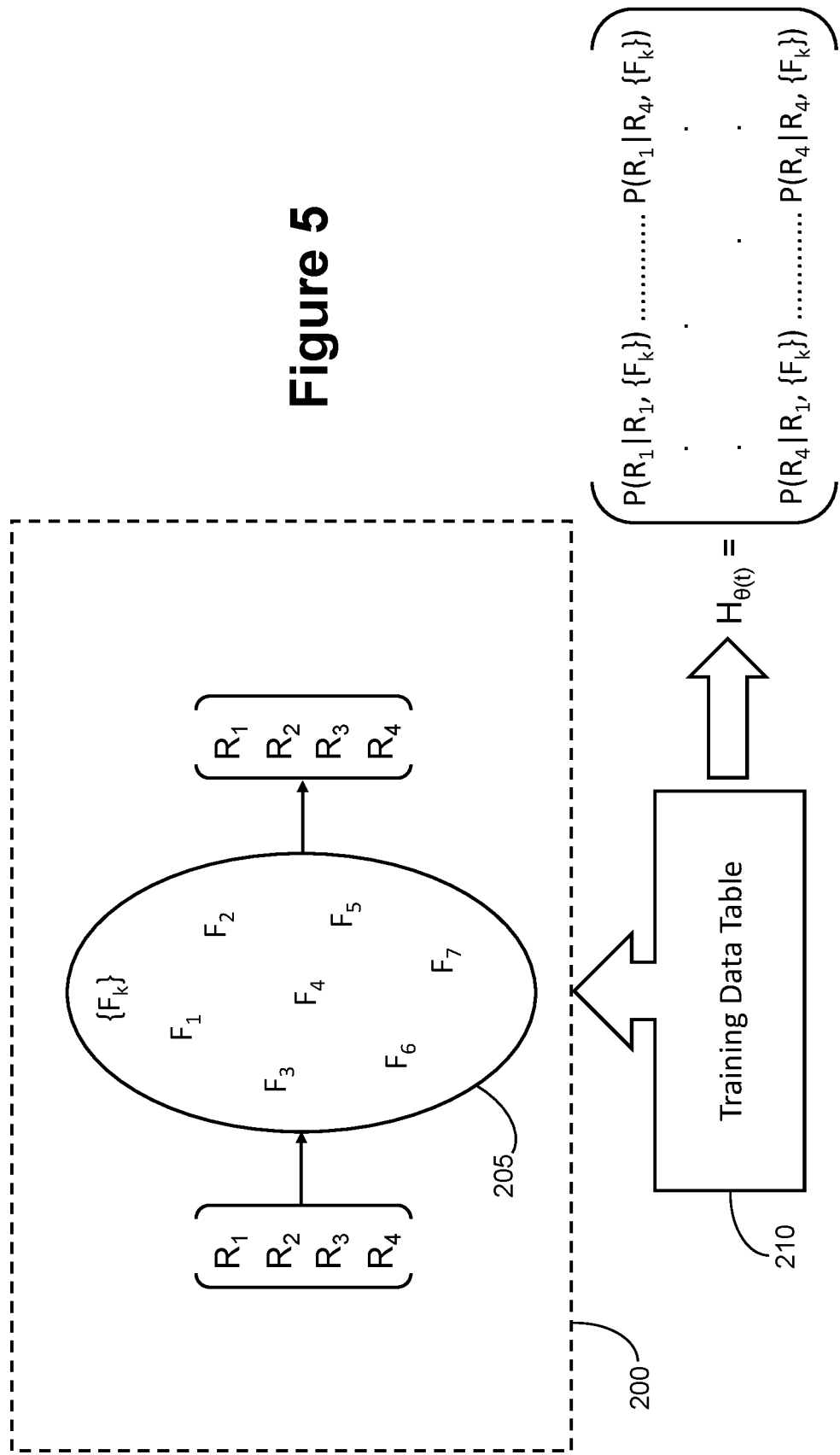
FIG. 5 is a representation of the principles implemented in a trained model for determining state transition probabilities of a time varying Markov chain as applied in an example method disclosed herein.

Referring to FIG. 5, the pre-generated model 200 maps different possible network conditions to different possible transitions from one level of resolution, in this example one of four possible levels $R_1$, $R_2$, $R_3$, $R_4$, to another of the four possible levels $R_1$, $R_2$, $R_3$, $R_4$.

The different possible network conditions are represented in the model by respective combinations of the possible values for each of a set $\{F_k\}$ of features 205, where k=1, . . . , n, n being the number of features in the set, in this example seven features $F_1$ to $F_7$. The model 200 may be trained using a training data set 210 to record conditional probabilities that any one of the possible levels of resolution $R_1$, $R_2$, $R_3$, $R_4$ will remain the same, or change from one of the possible levels of resolution $R_1$, $R_2$, $R_3$, $R_4$ to another, as a result of network conditions indicated by respective combinations of values for the set of features $\{F_k\}$. The conditional probabilities $P(R_i|R_j, \theta(t))$ corresponding to a given set of values θ(t) for the set of features $\{F_k\}$ may be obtained from the model 200 in the form of a state transition probability matrix $H_{\theta(t)}$, where the rows and columns of the matrix correspond to the states of the Markov chain, in this example the different possible levels $R_1$, $R_2$, $R_3$, $R_4$ of video resolution.

The pre-generated model 200 may be implemented in any one of a number of known ways and may be generated in an offline processing stage. There is vast academic literature on coding theory that may be applied to the representation of possible state transition matrices. In one example implementation, the model 200 may comprise a database of compressed client behavior patterns using a known compression technique to represent all the possible combinations of values for the set of features $\{F_k\}$ and possible resolution transitions. The model may be trained using a training data set 210 to assign respective probabilities to the different resolution transitions for a particular set of network conditions. The step 115 in the above method, of accessing the model 200 to obtain the state transition probability matrix $H_{\theta(t)}$ may, in this example, comprise applying decompression, parameterized by θ(t), the determined feature values for the current chunk, to the database of compressed client behavior patterns, extracting the most proper state-transition probability matrix $H_{\theta(t)}$ for the Markov chain.

In one example embodiment of the model 200, one or more decision trees may be used to represent, as a hierarchy of decision nodes, the different possible combinations of values of the predetermined set of features $\{F_k\}$ and the different possible first levels of video resolution. Leaf nodes of the decision tree comprise the different possible second levels of video resolution that may result by following respective paths through the decision nodes of the decision tree. Each path through the decision nodes of the decision tree represents a rule that results in the same, or a transition to different level of video resolution. In an alternative implementation, the different possible rules may be represented by decision lists or multiple decision trees having decision nodes representing single values for the respective features so that each 'rule' may be represented by a different decision tree or decision list.

A training data set 210 may be assembled by previous experiment or observation, for example in the form of a training data table, recording actual observations made over a period of time. The training data may be split by buffering resolution as an explaining variable. Each row of the training data table may record the current level of buffering resolution, an observed combination of values for the set of features $\{F_k\}$ and the resultant level of buffering resolution at a client device. For each current level of resolution a decision tree may be trained to code the possible transitions from that current resolution into the others. The decision tree would merge similar network conditions in a way that tries to give the best predictions for a target variable—as such, it provides lossy compression. In each leaf node the distribution of the target variable is available as a row vector, which is a symbol in the compression procedure. Decompression can be carried out in a simple and efficient manner as the best fitting transition probability matrix one can reconstruct by querying the resolution distribution from each tree according to $\theta(t)$. Each tree will return a symbol, which is one row of $H_{\theta(t)}$.

The decision tree may be 'trained' by recording what proportion of the rows in the training data table satisfy each 'rule' represented by a path through the decision tree to a leaf node. In this way, a conditional probability $P(R_j|R_i, F_k)$ may be determined and recorded in the model for each possible path through the decision tree, providing a probability that the network conditions represented by a set of values $F_k$ for the features $\{F_k\}$ will cause the resulting level of video resolution $R_j$ at a client device to be the same or to change from a current level of video resolution $R_i$. For example, if there are 25 of 1000 instances recorded in the training data table for which a particular set of feature values cause a current level of video resolution to change from 720p to 1080p resolution, then this particular path through the network is assigned a conditional probability of 0.025. Those paths through the decision tree that are not represented in the training data table are assigned a conditional probability of 0.

In another example implementation of the model, a neural network may be trained using the training data set 210 to relate, with respective conditional probabilities, one or more first levels of resolution to one or more second levels of resolution for different combinations of values for the set of features. Other implementations of machine learning techniques may be applied to generate the model, as would be apparent to a person of ordinary skill in the relevant art.

It is useful to measure compression performance of the trained model. Whether the model uses decision trees or different machine learning models to provide the conditional probabilities, usual compression performance metrics such as accuracy, recall, precision, F1, compression ratio, may not be the best choice. Such metrics are more suited to assessing performance of classifiers. The decision tree implementation of the present example has a number of possible levels of resolution as the leaf node variable. In this case, compression performance, that is, how good are the transition matrices produced by the trained model, should be measured by checking the second largest eigenvalues and determinants of the possible state-transition matrices. State-transition matrices with high second largest eigenvalues indicate uncertainty, which should be avoided—compression should be done in such a way that the second largest eigenvalues are as small as possible. Furthermore, if the determinant of a state transition probability matrix is near to 0, this implies that the matrix is close to being linearly dependent, which means that two or more rows are almost the same, i.e. states could be merged, which is not desirable.

When the set of feature values $\theta(t)$ has been determined for the current chunk, at 110, the corresponding matrix $H_{\theta(t)}$ of transition probabilities may be assembled at 115 by selecting from the model those paths through the decision tree representing the different possible current levels of resolution in combination with the determined values $\theta(t)$ for the set of features $\{F_k\}$. The pre-generated state transition probabilities may be read for each of the resultant levels of resolution represented by respective leaf nodes. If required, the different possible levels of resolution represented in the leaf nodes may be grouped into a smaller number of resolution categories, e.g. Low, Medium and High, and the associated state transition probabilities may be combined to give a 3×3 matrix $H_{\theta(t)}$ of transition probabilities.

The method then moves on, at 120, to use the state transition probability matrix $H_{\theta(t)}$ determined at 115 to calculate how the first probability distribution $\pi_t$ obtained at 100 is likely to change as a result of the indicated network conditions, so determining the next set of state probabilities in the Markov chain. This is achieved using the state transition probability matrix $H_{\theta(t)}$ to calculate a second probability distribution $\pi_{t+1}$ according to $$\pi_{t+1} = \pi_t H_{\theta(t)}.$$

The second probability distribution $\pi_{t+1}$ indicates the probabilities that each of the different levels of resolution at the client device 20, 25 will be achieved at the client device 20, 25 as a result of the network conditions indicated at 110, given that the probability distribution was previously the first probability distribution $\pi_t$ obtained at 100. This method thereby simulates the inventive assumption that levels of resolution likely to be experienced at the client device 20,25 evolve in the manner of a state machine.

The method then returns to 105 to be repeated, wherein the second probability distribution $\pi_{t+1}$ calculated at 120 becomes the first probability distribution $\pi_t$ obtained at 100, and 105 comprises selecting a new 'current' chunk of the video stream.

As mentioned above, when describing feature 100 of the method, there are several ways to obtain the first probability distribution, besides that indicated above for a first or subsequent iteration of the method.

In one example, obtaining the first probability distribution comprises estimating a first probability for each of the of states of the Markov chain to be 1/n, where n is the number of different levels of playout resolution that may be achieved at the client device by the delivered video stream. In another example, similar to the iteration example above, obtaining the first probability distribution comprises determining a probability distribution for the states of the Markov chain resulting from network conditions indicated by analysis of data packets in a selected chunk preceding the current chunk in the encrypted video stream.

The application of Markov chains in the method described above has several benefits. Markov chains always converge to a steady state distribution. This means that small fluctuations in $\theta(t)$ will not have an instant effect, they will simply start convergence to a new steady state, which may be counteracted by $\theta(t+1)$. However, if the network conditions remain relatively unchanged for a longer time period, i.e. $\theta(t)=\theta(t+1)=\ldots=\theta(t+k)$ for some relatively large k, then the Markov chain will converge to a new steady state distribution. This mechanism implicitly reduces the chance of resolution ping-pong in which attempts to predict changes to the level of resolution based upon fluctuating network conditions oscillates between two values. The convergent behavior also protects against sudden drops in predicted resolution by enforcing a gradual increase or decrease. From basic linear algebra and probability theory it is known that the smaller the second largest eigenvalue of the transition matrix H, the faster the Markov chain will converge. Furthermore, if the second largest eigenvalue is high (around 1), then in practice this means that there is another probability distribution that is almost stable. That is, under uncertain conditions, the Markov chain will converge slower, which is also a welcomed property. Finally, the steady state distribution of a Markov chain does not depend on the initial conditions, meaning that whatever the current resolution distribution, if a new transition matrix is set, the chain will converge to the new steady state regardless. This property is also beneficial, because if n is the number of possible levels of resolution, then $\pi_0=1/n$ is always a good choice for the first probability distribution obtained at 100 in the method. Such a distribution is an uninformative prior but does not affect the steady state. If for some period of time the model fails to capture the true behavior of a client/server then, when a well-conditioned transition matrix is next produced, it will put the Markov chain back to the right track and errors will not be able to cascade through subsequent predictions, indefinitely.

The method described above with reference to FIG. 3 may be repeated over a series of chunks of the video stream and the resultant second probability distributions $\pi_{t+1}$ may be stored in a database. The contents of the database may be used to calculate one or more key performance indicators (KPIs) indicating the quality of a user's viewing experience (QoE) of a video delivered to the user's client device 20, 25.

In one example, one or more of the following KPIs may be calculated using contents selected from such a database of probability distributions:
 (expected) number of resolution changes (either or both of increased and decreased resolution changes);
 (expected) time spent at each different level of resolution;
 (expected) time to recover after the level of resolution decreases.

Given that probability distributions are generated for the possible levels of resolution, expected values may be calculated for each of the metrics measured in these KPIs. Any of these KPIs may be calculated and reported on a per chunk, per video or per session basis. A real example of the application of the above-described method and the resultant KPIs may be represented graphically, as for example is shown in FIG. 6.

Figure 6:
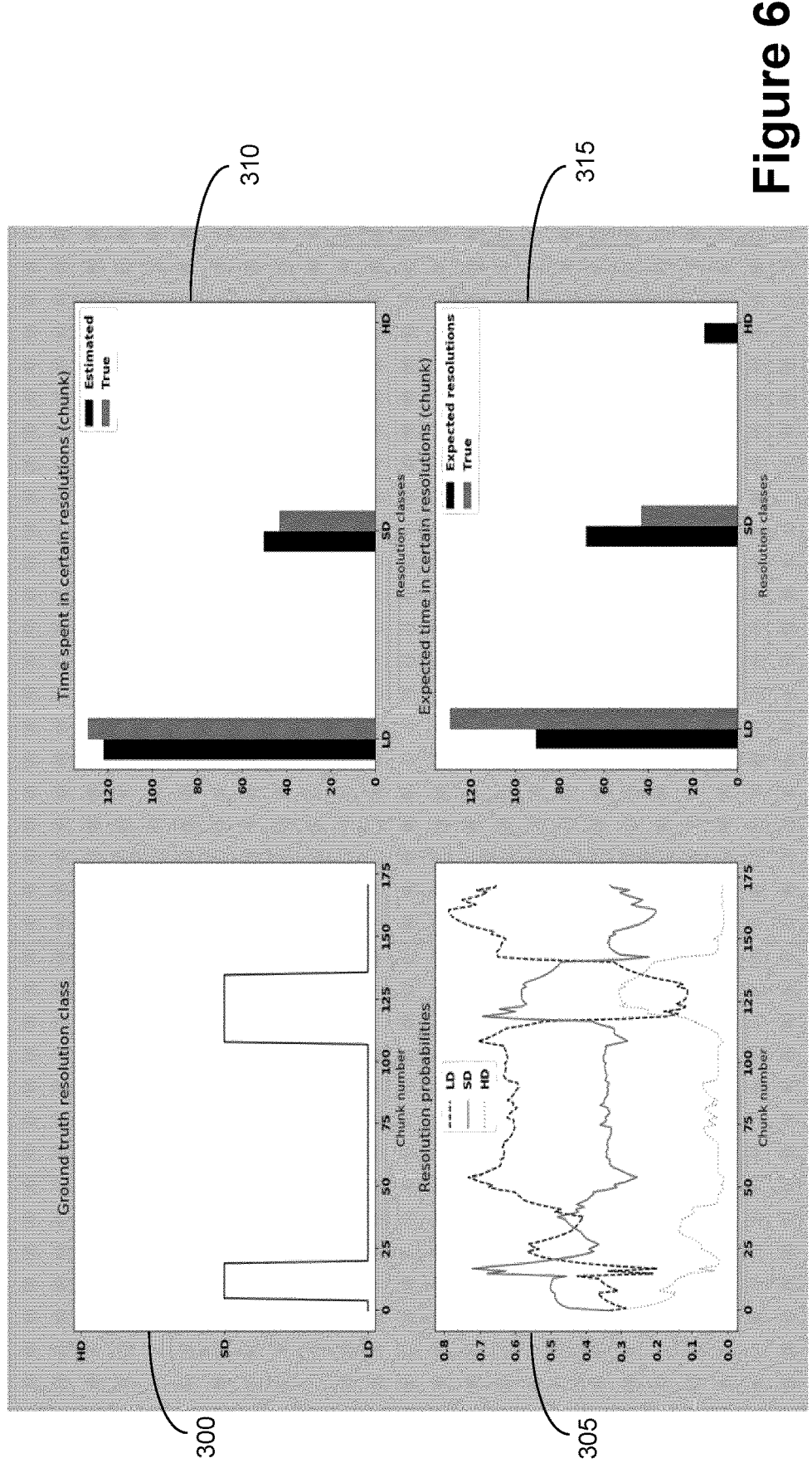
FIG. 6 shows four graphs to illustrate performance of an example application of methods disclosed herein.

Referring to FIG. 6, the above-described method was applied to the streaming of an encrypted video and the above KPIs were calculated. In this example, the possible levels of resolution were grouped into three resolution groups, or classes: Low Definition (LD), Standard Definition (SD) and High Definition (HD). The graph 300 in FIG. 6 shows how the level of resolution actually changed over time (where time is measured by the number of the current chunk) for a whole video session (containing more than one video) of a subscriber. Each chunk in this example represents 15 seconds of video playout time.

The graph 305 shows how the probability of each resolution class, determined by application of the above-described method, changes over time. Note the smooth transition between resolution classes.

The graph 310 shows one of the example KPIs: the total time spent in each resolution class throughout the whole session (measured in number of chunks). This KPI was calculated using the maximum likelihood estimate of resolution at each time step (chunk). Similarly, the graph 315 shows the expected value of the same KPI. Note how uncertainty arising from the probability distribution changes the results compared to the maximum likelihood estimate above. While the latter resembles the true time spent in different resolution classes better, the former provides information about network quality—the more the network conditions vary, the more uncertain the probability distributions become (their entropy increases), having a larger effect on the expected value.

An example data processing structure that may be used to implement the above-described method will now be described with reference to FIG. 7.

Figure 7:
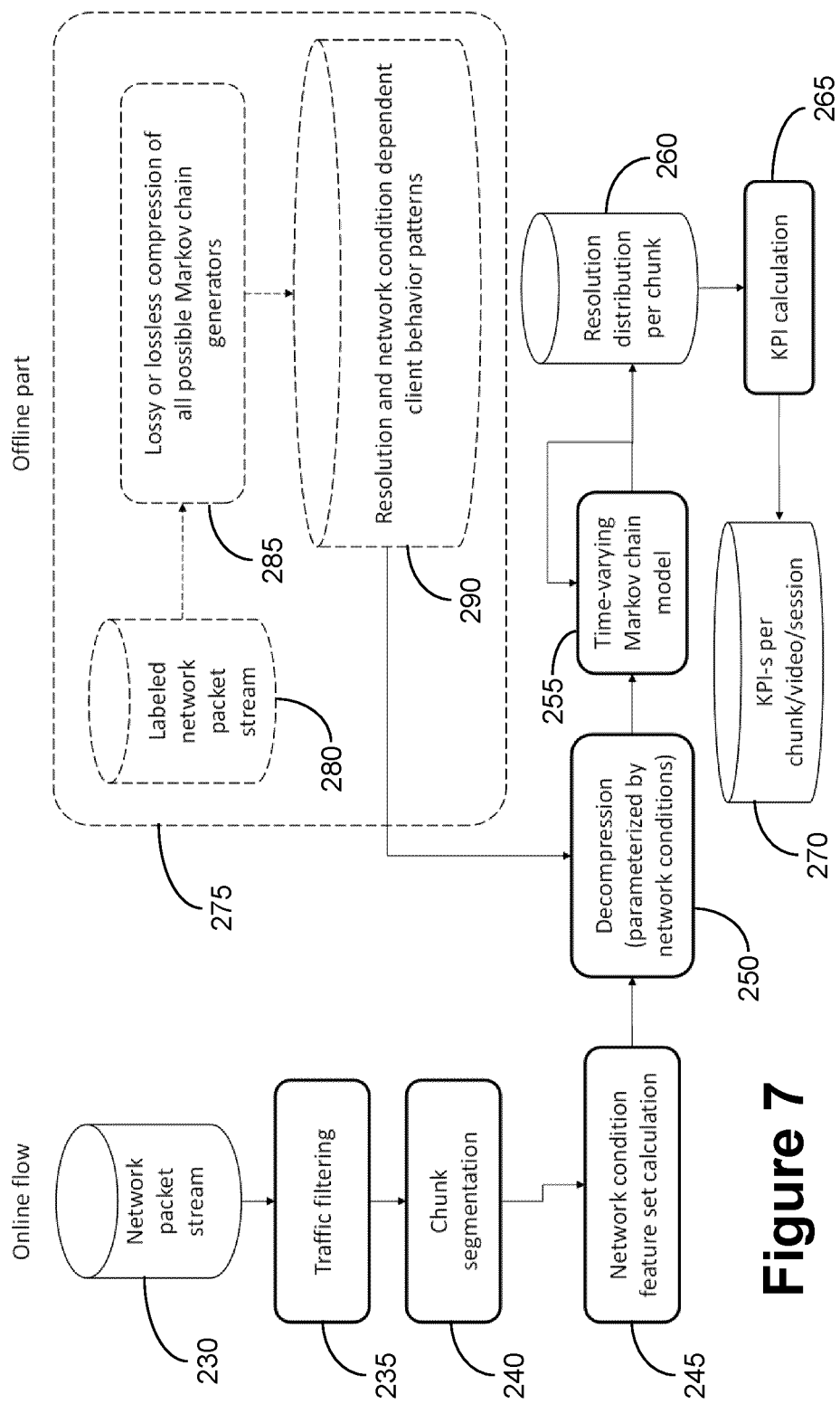
FIG. 7 is a schematic representation of an example data processing structure as may be used to implement example methods disclosed herein.

Referring to FIG. 7, an example data processing structure may comprise an "online" flow and an "offline" part. The online flow comprises, at 230, a function to access an encrypted video packet stream flowing through a network. The online flow also includes a traffic filtering function 235 and a chunk segmentation function 240, implementing feature 105 of the method described above. The online flow also includes a network condition feature set calculation function 245, implementing feature 110 of the above method. The online flow also includes a decompression function 250, the decompression being parameterized by determined network conditions, implementing feature 115 of the above method. The online flow also includes a time-varying Markov chain model 255, implementing that state machine innovation of the above method. The online flow also includes a function 260 determining the probability distribution of resolutions resulting from each selected chunk, implementing feature 120 of the above method. The online flow also includes a KPI calculation function 265 to calculate KPIs from the output of the function 260 and to store the calculated KPIs in a store 270 on a per chunk, per video or per session basis.

The offline part 275 of the data processing structure in FIG. 7 includes a labeled network packet stream function 280, a lossy or lossless compression function 285 for compression of all possible Markov chains, and a store 290 for storing resolution and network condition-dependent client behavior patterns. The store 290 provides output to the decompression function 250 of the online flow.

The online part is responsible for estimating resolution probabilities by first filtering relevant traffic, segmenting packets into video chunks (since resolution is the same within a chunk), calculating features that describe the current network conditions, then according to these conditions selects the most proper state-transition probability matrix for a time-varying Markov chain that describes the evolution of resolution in time. Since there can be infinitely many state-transition probability matrices, the offline part of the solution applies (lossy or lossless) compression and stores the results in a database, from which the online flow decompresses the most relevant matrix in an efficient way.

In one example implementation of the method described above, of interest to a 5G mobile network operator, at least a part of the method may be implemented as one or more network functions (NF) in a 5G network Core (5GC) or as a network data analytics function (NWDAF), as will now be described with reference to FIG. 8 and FIG. 9. A Network Data Analytics (NWDA) framework has been established for defining the mechanisms and associated functions for data collection in 5G networks. The NWDA framework is centered on a Network Data Analytics Function (NWDAF) that collects data from other network functions in the network. The NWDAF also provides services to service consumers (e.g. other network functions). The services include, for example, retrieving data or making predictions based on data collated at the NWDAF.

Figure 8:
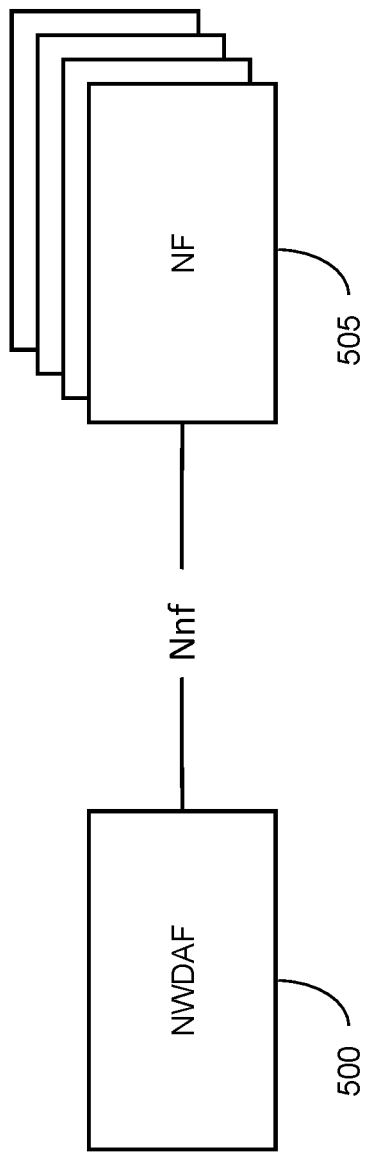
FIG. 8 is a schematic representation of an arrangement of physical or virtual nodes in a mobile communications network that may be configured to implement example methods disclosed herein.

Referring to FIG. 8, a NWDAF 500 is shown linked to each of a number of network functions (NF) 505. As illustrated, a network function 505 may be any suitable network function (e.g. an AMF, an AUSF or any other network function). The NWDAF 500 collects data from one or more of the network functions 505 by connecting to an Event Exposure Function at the network function 505 over an Nnf reference point (as detailed in the 3GPP document TS 23.288, v 16.0.0). The NWDAF 500 is then able to receive data from the network function 505 over the Nnf reference point by subscribing to reports from the network function 505 or by requesting data from the network function 505. 3GPP TS 23.501 and TS 23.288 describe the network data analytic function (NWDAF) 500 as part of the architecture of a 5G core network. The NWDAF 500 uses the mechanisms and interfaces specified for 5GC 200 in 3GPP TS 23.501. More specifically, the NWDAF 500 interacts with different entities for different purposes, such as Data collection based on subscription to events provided by an AMF, SMF, PCF, UDM, AF and OAM, retrieval of information from data repositories, retrieval of information about the NFs 505 deployed in 5GC 200 and On-demand provision of analytics to NF consumers.

One or more NFs 505 may be configured, together with the NWDAF 500, to implement different features in the method disclosed herein. An example arrangement will now be described with reference to FIG. 9, and additionally with reference to FIG. 3. However, it will be clear to a person of ordinary skill in the relevant art that there are numerous variations in the way that features of the method shown in FIG. 3 are implemented by one or more network functions 505 in conjunction with the NWDAF 500. One example of an implementation will now be described.

Figure 9:
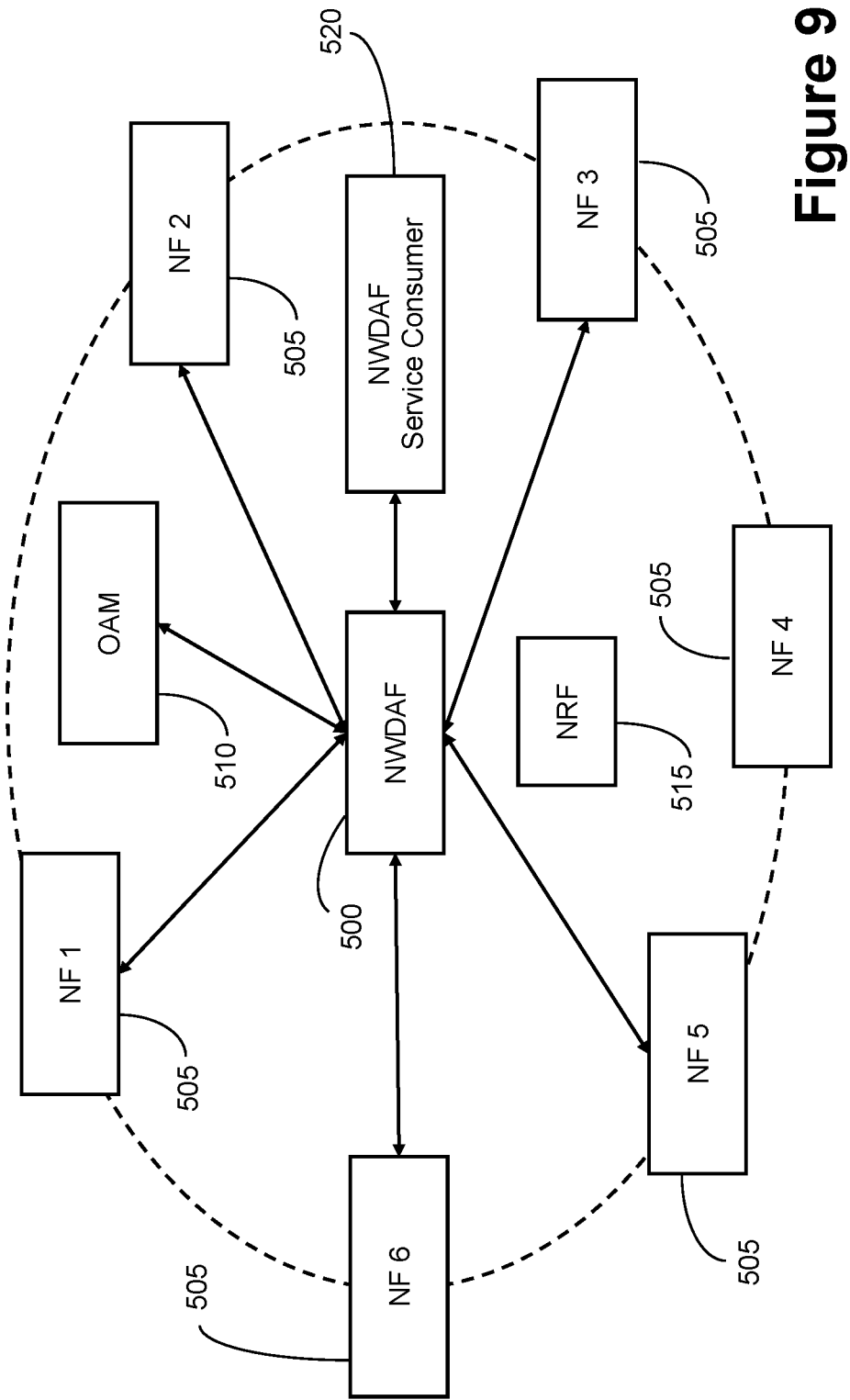
FIG. 9 is a schematic representation of an arrangement of physical or virtual nodes in a mobile communications network that may be configured to implement example methods disclosed herein.

Referring to FIG. 9, the NWDAF 500 is shown linked to five network functions 505: NF 1, NF 2, NF 3, NF 4 and NF 5. The NWDAF 500 is linked also to an operations, administration and maintenance node (OAM) 510. An NF repository function (NRF) 515 is also available to the network functions 505. The network functions 550 may also be arranged to interact with each other directly, for example to exchange data, and to store and retrieve data at the NRF 15. It is possible to use intermediate functions to route messages from one network function 505 to another. In a control plane, a set of interactions between two NFs 505 is defined as a service so that its reuse is possible. This service enables support for modularity. A user plane supports interactions such as forwarding operations between different user plane functions (UPFs). The service(s) etc. that a NF 505 provides to other authorized NFs can be exposed to the authorized NFs through a service-based interface. It should be clarified that all NFs depicted in FIG. 9 can interact with the NRF 515 as necessary, though not explicitly indicated in FIG. 9.

An NF 505 may be implemented either as a network element on a dedicated hardware, as a software instance running on a dedicated hardware, or as a virtualized function instantiated on an appropriate platform, e.g. a cloud infrastructure as will be described in one example below.

Network function NF 1 may for example be configured to implement a first part of the feature 105 in the method of FIG. 3. That is, NF 1 may be configured with access to the user plane functions (UPFs) to see both uplink and downlink data packets being communicated through the network. NF 1 may be configured to "filter out" packets from the encrypted video stream related to a particular video session between a particular subscriber's client device 20, 25 and a video service provider, e.g. the video service provider's video server 10. For example, NF 1 may be configured to identify and maintain a record, e.g. at the NF 515, indicating which of those packets in the video stream are relevant according to these criteria.

The network function NF2 may be configured to implement the remaining part of the feature 105 to select from the data packets indicated by NF1 those packets to form the current chunk, using by one or more of the techniques described and referenced above. Alternatively, the functionality required to implement feature 105 of the method may be implemented entirely by the network function NF 1 such that the NWDAF 500 may receive from NF 1 only an indication of the data packets selected for the current chunk.

The network function NF 3 may be configured to implement the feature 110 of the method of FIG. 3. That is, NF 3 may be configured to receive indications of the data packets selected by NF2 or NF 1 for the current chunk, for example by accessing stored indications at the NRF 515. NF 3 may be configured to analyze the indicated data packets of the current chunk and to determine values θ(t) for the predetermined set of features $\{F_k\}$, as described above, indicative of conditions in the network. NF 3 may store the determined feature values θ(t) at the NRF 515.

The network function NF 4 may be configured to implement the feature 115 of FIG. 3. That is, NF4 may be configured to receive the determined feature values θ(t) for the current chunk, for example by accessing the NRF 515. NF 4 may be configured to access a pre-generated model to obtain a state transition probability matrix corresponding to the determined set of feature values θ(t). The network function NF 4 may access the pre-generated model either directly or via the NWDAF 500. The pre-generated model may be generated and stored by functionality implemented, for example, in a part of a cloud virtualized data processing infrastructure of a type to be described below with reference to FIG. 10. NF 4 may store the obtained state transition probability matrix at the NRF 515.

The network function NF 5 may be configured to implement the feature 120 of FIG. 3. That is, NF5 may be configured to receive the state transition probability matrix obtained by NF 4, for example by accessing the NRF 515. NF 5 may be configured to apply the obtained matrix to calculate a second probability distribution for the levels of resolution, using a first probability distribution for the implemented Markov chain obtained at feature 100 of the method. NF 5 may store the calculated second probability distribution in the NRF 515.

In one example implementation, NF 5 may be configured to implement feature 100 of the method by obtaining from the NRF 515 a second probability distribution calculated by itself in respect of a previous chunk and using that as the first probability distribution for the purpose of feature 120 and the current chunk, thereby iterating the Markov chain. Alternatively, NF 5 may determine a first probability distribution based upon the number of levels of resolution for the purposes of implementing feature 120 for the current chunk, as described above.

The NWDAF 500 may be connected to a NWDAF Service Consumer 520. The NWDAF 500 exposes information over an Nnwdaf reference point. Thus, the NWDAF Service Consumer 520 (which may be any network function or entity authorized to access the data) subscribes to receive analytics information or data from the NWDAF 500 and this is acknowledged. Thereafter, the NWDAF 500 may transmit or expose reports to the NWDAF Service Consumer 520. The exposed or transmitted reports may be used by another network function, for example, to calculate one or more KPIs of the types described above. Alternatively, the NWDAF 500 or another network function 505 may calculate the KPIs and expose or report the KPIs to the NWDAF service consumer 510. The reported KPIs may then be used in various ways to trigger configuration changes in the network to overcome any issues indicated by the reported KPIs with the quality of a user's experience in viewing videos communicated over the network.

In another example implementation of the methods disclosed herein in older networks, there may be a node, for example a core network node, that is usually responsible for deep/shallow packet inspection. If resources allow, then the methods disclosed herein may be implemented entirely in this node. Most likely however, only the feature set calculation (110, or parts of it) may be performed in that node, due to the high load these nodes typically experience (they have only a few milliseconds to deal with a specific packet on the network). The output of this node may then be fed into an additional node that iterates the Markov chain, and writes its output of the calculated second probability distribution to a database.

In another example implementation of the methods disclosed herein, other types of network node, for example a node in a public mobile or fixed line access network, a node of a CDN, or other node with access to video traffic passing between a video server 10 and a client device, may implement methods disclosed herein. In general, as used herein, a "network node" may for example include any node that is either part of a radio access network or a core network of a cellular or any other type of communications network/system.

In principle, the method may be implemented in a client device 20, 25, for example one configured with a customized operating system or using an installed app, with user-defined permissions.

In another example implementation of methods disclosed herein, cloud-based virtualized solutions may become favoured by MNOs as they offer hardware cost reduction. Methods such as those described above do not require specialized hardware to implement the method, such as the generation of the model 200. Such functions may be implemented somewhere other than in one specific node in a core network, as will now be described with reference to FIG. 10.

Figure 10:
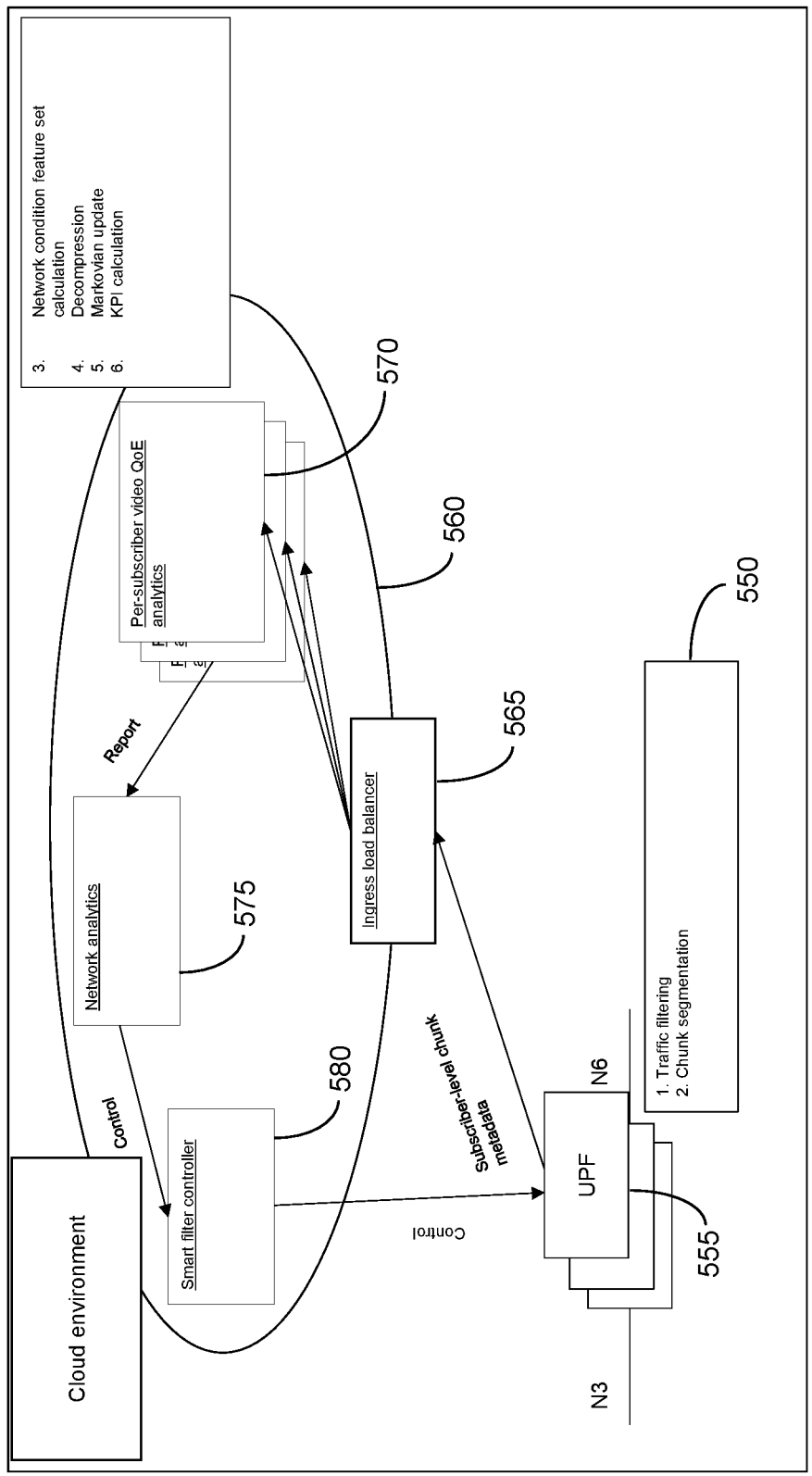
FIG. 10 is a schematic representation of an example data processing structure including a virtualized cloud environment in which may be implemented example methods disclosed herein.

Referring to FIG. 10, the methods disclosed herein may be considered in two parts. As a first part, the traffic filtering and basic chunk detection steps (105) require the monitoring of the complete traffic of a given subscriber, as does the parsing and extracting of values for the set of features (110). This part may be implemented at a node 550 in a mobile communications network 30, for example, wherever user plane traffic is carried through, e.g. the User Plane Function (UPF) 555 in 5G networks, as for the example 5GC implementation described above. However, feature values θ(t) determined for multiple selected chunks, or at multiple times for multiple subscribers, may be bundled together and forwarded to a cloud environment 560, using a common interface, an Ingress Load Balancer 565, e.g. a Representational State Transfer Application Programming Interface (REST API), where the data can be spread amongst multiple worker nodes 570, for example a Per-subscriber video QoE analytics node. The worker nodes 570 may implement model access functions to extract respective state transition probability matrices and, optionally, to calculate KPIs. The state transition probability matrices may then either be communicated back to the originating node or retained in the cloud environment 560 where the remaining steps of the proposed method may be implemented. In particular, a Network Analytics node 575 may perform further analysis of the output of the worker nodes 570, for example to identify issues affecting QoE of one or more subscribers.

In a typical application, it may be preferred to use the method to perform a detailed subscriber analysis (575) in the cloud environment 560 and to then focus only on a certain group of subscribers where respective KPIs indicate that they may require extra attention. In one example approach, a group of subscribers may be randomly chosen by a Smart Filter Controller 580, and/or based upon output by the Network Analytics node 575, and a detailed analysis may be performed, e.g. implementing the methods disclosed herein in respect of each selected subscriber in the group. If any fraction of the monitored subscribers reports bad video QoE, an automatic incident detection system may be triggered to modify smart filtering rules in a way to focus more on the problematic area. Such enhanced monitoring requires fast resource redistribution, which can be easily implemented in any modern virtualized cloud environment.

Smart filtering (580) may be beneficially implemented because there is a lot of traffic going through the network, and this is expected to increase even further with 5G. It is impractical to inspect all of the traffic by the methods disclosed herein. Therefore, it is preferred to try to monitor only some parts/subscribers on the network. The question is how to do this, and what should be monitored, and how this monitoring should change over time to give the best possible coverage. These questions are addressed by smart filtering and adjustment of the smart filtering rules to attempt to determine what subset of network traffic is going to be analyzed. For example, if it is determined that by monitoring a small group of subscribers in a given area, there is generally as low QoE, this may provide some input to the smart filtering controller 580 to focus on more subscribers in that area. Analyzing their traffic as well, it may be determined that a) everything's fine, most KPIs are satisfactory, or b) all the new subscribers show bad KPIs, confirming that there is something wrong in that area.

There are a number of possible responses that may be triggered when it is determined from the KPIs that there is an issue to be resolved. The responses may be short-term configuration changes or longer term reconfiguration or provisioning exercises. In one example, the network may be triggered to provide more bandwidth to one or more subscribers if this can be done without causing problems for other subscribers using the network. A longer term response, in a mobile communication network 30, may be to provision additional cells in an area in which it is determined that there are a large number of video subscribers experiencing generally low levels of QoE. An alarm system may also be implemented to alert network engineers to particular problems that can be localized to a particular part of the network.

The present disclosure describes example embodiments which may be summarized as follows.

Example embodiments include a method for estimating playout resolution of a video delivered to a client device by an encrypted video stream communicated over a network, the method comprising:
  (i) obtaining a first probability distribution for a plurality of states of a Markov chain, the states comprising a plurality of different levels of playout resolution that may be achieved at the client device by the delivered video stream;

(ii) selecting a current chunk of the encrypted video stream comprising data packets expected to carry video data of the same level of playout resolution;

(iii) by analysis of the data packets in the selected current chunk, determining values for features in a predetermined set of features indicative of conditions in the network;

(iv) using a pre-generated model to obtain, given the determined set of feature values from (iii), a corresponding set of state transition probabilities of the Markov chain; and (v) applying the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

In one example of the method, (i) comprises estimating a first probability for each of the plurality of states of the Markov chain to be 1/n, where n is the number of different levels of playout resolution that may be achieved at the client device by the delivered video stream.

In another example of the method, (i) comprises determining a probability distribution for the plurality of states of the Markov chain resulting from network conditions indicated by analysis of data packets in a selected chunk preceding the current chunk in the encrypted video stream. In this example, the selected chunk preceding the current chunk may optionally be separated from the current chunk in the encrypted video stream by one or more intermediate chunks.

In another example of the method, the data packets of the selected current chunk of the encrypted video stream relate to a single video session between the client device and a video service provider.

In another example of the method, selecting the current chunk of the encrypted video stream comprises selecting data packets having a payload size above a predetermined threshold.

In another example of the method, selecting the current chunk of the encrypted video stream comprises selecting data packets expected to carry a portion of the video of a predetermined time duration.

In another example of the method, the predetermined set of features comprises one or more of:
a burst inter-arrival time between the selected current chunk and a preceding or a succeeding chunk of the encrypted video stream;
an anomaly in the size of request messages sent by the client device; and
a bit rate of the encrypted video stream.

In another example of the method, at (iv), the pre-generated model relates, with a probability determined with reference to a training data set, a first level of resolution of a video delivered to a client device to a second level of resolution delivered to the client device as a result of network conditions indicated by a respective combination of values for the set of features, the model thereby providing, for a determined set of feature values, a conditional probability that the second level of resolution will result, given the first level of resolution. In this example, optionally at (iv), the pre-generated model comprises:

a decision tree comprising decision nodes representing different possible values for features in the set of features and different possible first levels of the plurality of levels of resolution, and leaf nodes representing different possible second levels of the plurality of levels of resolution; and associated with a path through the decision tree to a leaf node, a state transition probability determined with reference to a training data set comprising instances in which the network conditions indicated by the set of feature values and the first level of resolution represented in the path result in a transition to the second level of resolution represented by the leaf node.

In a further option for implementation of the pre-generated model, at (iv), the pre-generated model comprises a neural network, trained with reference to the training data set, to relate with respective conditional probabilities one or more first levels of resolution to one or more second levels of resolution for different combinations of values for the set of features.

In another example, the method comprises:
(vi) repeating (i) to (v) wherein, at (i), the first probability distribution comprises the second probability distribution determined at (v), and (ii) comprises selecting a next chunk of the encrypted video stream to be the current chunk.

In this example of the method, optionally, the method comprises:
(vii) calculating, using the second probability distribution determined at (v) over one or more successive chunks, one or more performance indicators of the quality of experience (QoE) of a user viewing a video delivered to the client device by the encrypted video stream.

The one of more performance indicators may for example be selected from:
expected number of changes from a first level of resolution to a second, different level of resolution;
expected time spent playing out video at the client device at one of the plurality of different levels of resolution; and
expected time to recover a given one of the plurality of different levels of playout resolution following a reduction in the level of playout resolution.

Furthermore, the one or more performance indicators may be determined for at least one of:
each time period represented by a selected chunk of the encrypted video stream;
a video session;
an entire video.

Furthermore, in this example of the method, optionally, the method comprises:
(viii) adjusting communications parameters of the network according to the one or more performance indicators calculated at (vii).

In another example of the method, the method comprises grouping the plurality of different levels of resolution into two or more groups of playout resolutions and wherein the states of the Markov chain comprise the two or more groups of playout resolutions.

In an example implementation, there is disclosed a network node, or a group of nodes, of a network, configured with access to data packets carrying an encrypted video stream being communicated through the network, the network node, or group of nodes, being configured to estimate playout resolution of a video delivered to a client device by the encrypted video stream by:
(i) obtaining a first probability distribution for a plurality of states of a Markov chain, the states comprising a plurality of different levels of playout resolution that may be achieved at the client device by the delivered video stream;

(ii) selecting a current chunk of the encrypted video stream comprising data packets expected to carry video data of the same level of playout resolution;

(iii) by analysis of the data packets in the selected current chunk, determining values for features in a predetermined set of features indicative of conditions in the network;

(iv) using a pre-generated model to obtain, given the determined set of feature values from (iii), a corresponding set of state transition probabilities of the Markov chain; and (v) applying the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

In one example implementation, the network node, or group of nodes is configured, at (i), to estimate a first probability for each of the plurality of states of the Markov chain to be 1/n, where n is the number of different levels of playout resolution that may be achieved at the client device by the delivered video stream.

In another example implementation, the network node, or group of nodes is configured, at (i), to determine a probability distribution for the plurality of states of the Markov chain resulting from network conditions indicated by analysis of data packets in a selected chunk preceding the current chunk in the encrypted video stream.

Optionally, in this example implementation, the selected chunk preceding the current chunk is separated from the current chunk in the encrypted video stream by one or more intermediate chunks.

In another example implementation, the network node, or group of nodes is configured, at (ii), to select the data packets for the current chunk of the encrypted video from data packets identified as relating to a single video session between the client device and a video service provider.

In another example implementation, the network node, or group of nodes is configured, at (ii), to select data packets for the current chunk of the encrypted video stream comprises from data packets determined to have a payload size above a predetermined threshold.

In another example implementation, the network node, or group of nodes is configured, at (ii), to select data packets for the current chunk of the encrypted video stream from data packets expected to carry a portion of the video of a predetermined time duration.

In another example implementation, the network node, or group of nodes is configured, at (iii), to determine values for the predetermined set of features comprising one or more of:
- a burst inter-arrival time between the selected current chunk and a preceding or a succeeding chunk of the encrypted video stream;
- an anomaly in the size of request messages sent by the client device; and
- a bit rate of the encrypted video stream.

In another example implementation, at (iv), the pre-generated model relates, with a probability determined with reference to a training data set, a first level of resolution of a video delivered to a client device to a second level of resolution delivered to the client device as a result of network conditions indicated by a respective combination of values for the set of features, the model thereby providing, for a determined set of feature values, a conditional probability that the second level of resolution will result, given the first level of resolution.

In this example implementation, optionally, at (iv), the pre-generated model comprises:
- a decision tree comprising decision nodes representing different possible values for features in the set of features and different possible first levels of the plurality of levels of resolution, and leaf nodes representing different possible second levels of the plurality of levels of resolution; and
- associated with a path through the decision tree to a leaf node, a state transition probability determined with reference to a training data set comprising instances in which the network conditions indicated by the set of feature values and the first level of resolution represented in the path result in a transition to the second level of resolution represented by the leaf node.

In this example implementation, alternatively, at (iv), the pre-generated model comprises a neural network, trained with reference to the training data set, to relate with respective conditional probabilities one or more first levels of resolution to one or more second levels of resolution for different combinations of values for the set of features.

In another example implementation, the network node, or group of nodes is configured:
(vi) to repeat (i) to (v) wherein, at (i), the first probability distribution comprises the second probability distribution determined at (v), and (ii) comprises selecting a next chunk of the encrypted video stream to be the current chunk.

In this example implementation, the network node, or group of nodes is configured:
(vii) to calculate, using the second probability distribution determined at (v) over one or more successive chunks, one or more performance indicators of the quality of experience (QoE) of a user viewing a video delivered to the client device by the encrypted video stream.

Furthermore, in this example implementation, the network node, or group of nodes is configured, at (vii), to determine the one or more performance indicators selected from:
- expected number of changes from a first level of resolution to a second, different level of resolution;
- expected time spent playing out video at the client device at one of the plurality of different levels of resolution; and
- expected time to recover a given one of the plurality of different levels of playout resolution following a reduction in the level of playout resolution.

Furthermore, in this example implementation, the network node, or group of nodes is configured, at (vii), to determine the one or more performance indicators for at least one of:
- each time period represented by a selected chunk of the encrypted video stream;
- a video session;
- an entire video.

Furthermore, in this example implementation, the network node, or group of nodes is configured:
(viii) to adjust communications parameters of the network according to the one or more performance indicators calculated at (vii).

In another example implementation, the network node, or group of nodes is configured to group the plurality of different levels of resolution into two or more groups of playout resolutions such that the states of the Markov chain comprise the two or more groups of playout resolutions.

In another example implementation, the network node, or group of nodes comprises a network function, or group of aggregated network functions in a core network of a mobile communications network.

In another example implementation, the network node, or group of nodes comprises one or more servers of a Content Distribution Network (CDN).

In another example implementation, the network node, or group of nodes comprise one or more physical or virtualized nodes in a cloud data processing environment associated with the network.

In another example disclosed herein, there is provided a cloud-hosted data processing environment configured to implement a physical or virtualized functional node having an interface for receiving, from a network node according to examples disclosed above, values for features in a predetermined set of features indicative of conditions in a network, wherein the functional node is configured with access to a pre-generated model that relates, with a probability determined by reference to a training data set, a first of a plurality of levels of resolution of a video, as may be delivered to a client device over the network, to a second of the plurality of levels of resolution of the video as may be delivered to the client device as a result of network conditions indicated by a respective combination of values for the set of features, the functional node being configured to obtain from the model, for the received combination of values for the set of features, a set of conditional state transition probabilities for the possible transitions from a first of the plurality of levels of resolution to a second of the plurality of levels of resolution under network conditions indicated by the received combination of values for the set of features, and to output the obtained set of conditional state transition probabilities at the interface.

In another example disclosed herein, there is provided a network node, comprising a processor and a memory, the memory storing instructions executable by the processor thereby to configure the network node to access data packets carrying an encrypted video stream being communicated through the network and to estimate playout resolution of a video delivered to a client device by the encrypted video stream by:
   (i) obtaining a first probability distribution for a plurality of states of a Markov chain, the states comprising a plurality of different levels of playout resolution that may be achieved at the client device by the delivered video stream;
   (ii) selecting a current chunk of the encrypted video stream comprising data packets expected to carry video data of the same level of playout resolution;
   (iii) by analysis of the data packets in the selected current chunk, determining values for features in a predetermined set of features indicative of conditions in the network;
   (iv) using a pre-generated model to obtain, given the determined set of feature values from (iii), a corresponding set of state transition probabilities of the Markov chain; and
   (v) applying the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

In another example disclosed herein, there is provided a computer program which, when loaded into and executed by a processor, causes the processor to implement examples of the method disclosed herein.

In another example disclosed herein, there is provided a data carrier having stored thereon computer-readable instructions which, when downloaded and executed by a computer, cause the computer to implement the examples of the method disclosed herein.

In another example disclosed herein, there is provided a computer program product comprising a data carrier or a device for accessing a data carrier having stored thereon computer-readable instructions which, when downloaded and executed by a computer, cause the computer to implement examples of the method disclosed herein.

The invention claimed is:

1. A method for estimating playout resolution of a video delivered to a client device by an encrypted video stream communicated over a network, the method comprising:
   (i) obtaining a first probability distribution for a plurality of states of a Markov chain, the plurality of states comprising a different levels of playout resolution that may be achieved at the client device by the delivered video stream;
   (ii) selecting a current chunk of the encrypted video stream comprising data packets expected to carry video data of the same level of playout resolution;
   (iii) by analysis of the data packets in the selected current chunk, determining values for features in a predetermined set of features indicative of conditions in the network;
   (iv) using a pre-generated model to obtain, given the determined set of feature values from (iii), a corresponding set of state transition probabilities of the Markov chain; and
   (v) applying the determined state transition probabilities from (iv) to calculate, using the first probability distribution obtained at (i), a second probability distribution for the plurality of states of the Markov chain, and thereby for the plurality of different levels of playout resolution expected to result from the indicated network conditions.

2. The method according to claim 1, wherein (i) comprises determining a probability distribution for the plurality of states of the Markov chain resulting from network conditions indicated by analysis of data packets in a selected chunk preceding the current chunk in the encrypted video stream, wherein
   wherein the selected chunk preceding the current chunk is separated from the current chunk in the encrypted video stream by zero or more intermediate chunks.

3. The method according to claim 1, wherein the data packets of the selected current chunk of the encrypted video stream relate to a single video session between the client device and a video service provider.

4. The method according to claim 1, wherein selecting the current chunk of the encrypted video stream comprises at least one of: selecting data packets having a payload size above a predetermined threshold or selecting data packets expected to carry a portion of the video of a predetermined time duration.

5. The method according to claim 1, wherein the predetermined set of features comprises one or more of:
   a burst inter-arrival time between the selected current chunk and a preceding or a succeeding chunk of the encrypted video stream;

an anomaly in the size of request messages sent by the client device; and a bit rate of the encrypted video stream.

6. The method according to claim 1, wherein at (iv), the pre-generated model relates, with a probability determined with reference to a training data set, a first level of resolution of a video delivered to a client device to a second level of resolution delivered to the client device as a result of network conditions indicated by a respective combination of values for the set of features, the model thereby providing, for a determined set of feature values, a conditional probability that the second level of resolution will result, given the first level of resolution, and at (iv), the pre-generated model comprises a decision tree comprising decision nodes representing different possible values for features in the set of features and different possible first levels of the plurality of levels of resolution, and leaf nodes representing different possible second levels of the plurality of levels of resolution; and associated with a path through the decision tree to a leaf node, a state transition probability determined with reference to a training data set comprising instances in which the network conditions indicated by the set of feature values and the first level of resolution represented in the path result in a transition to the second level of resolution represented by the leaf node.

7. The method according to claim 6, wherein, at (iv), the pre-generated model comprises a neural network, trained with reference to the training data set, to relate with respective conditional probabilities one or more first levels of resolution to one or more second levels of resolution for different combinations of values for the set of features.

8. The method according to claim 1, wherein at (i), obtaining the first probability distribution comprises estimating a first probability for each of the plurality of states of the Markov chain to be 1/n, where n is the number of different levels of playout resolution that may be achieved at the client device by the delivered video stream, and the method further comprises: (vi) repeating (i) to (v) wherein, when repeating (i), obtaining the first probability distribution comprises using, as the first probability distribution, the second probability distribution determined at (v), and (ii) comprises selecting a next chunk of the encrypted video stream to be the current chunk.

9. The method according to claim 8, comprising:

(vii) calculating, using the second probability distribution determined at (v) over one or more successive chunks, one or more performance indicators of the quality of experience (QoE) of a user viewing a video delivered to the client device by the encrypted video stream, wherein the one of more performance indicators are selected from:

expected number of changes from a first level of resolution to a second, different level of resolution;

expected time spent playing out video at the client device at one of the plurality of different levels of resolution; and expected time to recover a given one of the plurality of different levels of playout resolution following a reduction in the level of playout resolution.

10. The method according to claim 9, wherein the one or more performance indicators are determined for at least one of:

a time period represented by a selected chunk of the encrypted video stream;

a video session; and/or an entire video.

11. The method according to claim 9, comprising:

(viii) adjusting communications parameters of the network according to the one or more performance indicators calculated at (vii).

12. The method according to claim 1, comprising grouping the plurality of different levels of resolution into two or more groups of playout resolutions and wherein the states of the Markov chain comprise the two or more groups of playout resolutions.

13. A network node, or a group of nodes of a network, configured with access to data packets carrying an encrypted video stream being communicated through the network, the network node, or each of the group of nodes comprising a processor and a memory, the memory storing instructions executable by the processor thereby to configure the network node, or group of network nodes, to access data packets carrying an encrypted video stream being communicated through the network and to estimate playout resolution of a video delivered to a client device by the encrypted video stream by:

(i) obtaining a first probability distribution for a plurality of states of a Markov chain, the states comprising a plurality of different levels of playout resolution that may be achieved at the client device by the delivered video stream;

(ii) selecting a current chunk of the encrypted video stream comprising data packets expected to carry video data of the same level of playout resolution;

(iii) by analysis of the data packets in the selected current chunk, determining values for features in a predetermined set of features indicative of conditions in the network;

(iv) using a pre-generated model to obtain, given the determined set of feature values from (iii), a corresponding set of state transition probabilities of the Markov chain; and (v) applying the determined state transition probabilities from (iv) to calculate, from the first probability distribution obtained at (i), a second probability distribution for the plurality of states of the Markov chain, thereby for the plurality of different levels of playout resolution expected to result from the indicated network conditions.

14. The network node, or group of nodes according to claim 13, the memory storing instructions executable by the processor thereby to configure the network node, or group of network nodes to, at (i), to determine a probability distribution for the plurality of states of the Markov chain resulting from network conditions indicated by analysis of data packets in a selected chunk preceding the current chunk in the encrypted video stream wherein wherein the selected chunk preceding the current chunk is separated from the current chunk in the encrypted video stream by zero or more intermediate chunks.

15. The network node, or group of nodes according to claim 13, the memory storing instructions executable by the processor thereby to configure the network node, or group of network nodes to, at (iii), determine values for the predetermined set of features comprising one or more of:

a burst inter-arrival time between the selected current chunk and a preceding or a succeeding chunk of the encrypted video stream;

an anomaly in the size of request messages sent by the client device; and a bit rate of the encrypted video stream.

16. The network node, or group of nodes according to claim 13, wherein, at (i), obtaining the first probability distribution comprises estimating a first probability for each of the plurality of states of the Markov chain to be 1/n, where n is the number of different levels of playout resolution that may be achieved at the client device by the delivered video stream, the memory storing instructions executable by the processor thereby to configure the network node, or group of network nodes to:

(vi) repeat (i) to (v) wherein, when repeating (i), obtaining the first probability distribution comprises using, as the first probability distribution, the second probability distribution determined at (v), and (ii) comprises selecting a next chunk of the encrypted video stream to be the current chunk.

17. The network node, or group of nodes according to claim 16, the memory storing instructions executable by the processor thereby to configure the network node, or group of network nodes to:

(vii) calculate, using the second probability distribution determined at (v) over one or more successive chunks, one or more performance indicators of the quality of experience (QoE) of a user viewing a video delivered to the client device by the encrypted video stream.

18. The network node, or group of nodes according to claim 17, the memory storing instructions executable by the processor thereby to configure the network node, or group of network nodes to: at (vii), determine the one or more performance indicators selected from:

expected number of changes from a first level of resolution to a second, different level of resolution, expected time spent playing out video at the client device at one of the plurality of different levels of resolution, and expected time to recover a given one of the plurality of different levels of playout resolution following a reduction in the level of playout resolution; and (viii) adjust communications parameters of the network according to the one or more performance indicators calculated at (vii).

19. The network node, or group of nodes according to claim 18, comprising one or more of:

a network function, or group of aggregated network functions in a core network of a mobile communications network;

one or more servers of a Content Distribution Network (CDN); or one or more physical or virtualized nodes in a cloud data processing environment associated with the network.

20. A cloud-hosted data processing environment configured to implement a physical or virtualized functional node having an interface for receiving, from a network node or group of nodes according to claim 13, values for features in a predetermined set of features indicative of conditions in a network, wherein the functional node is configured with access to a pre-generated model that relates, with a probability determined by reference to a training data set, a first of a plurality of levels of resolution of a video, as may be delivered to a client device over the network, to a second of the plurality of levels of resolution of the video as may be delivered to the client device as a result of network conditions indicated by a respective combination of values for the set of features, the functional node being configured to obtain from the model, for the received combination of values for the set of features, a set of conditional state transition probabilities for the possible transitions from a first of the plurality of levels of resolution to a second of the plurality of levels of resolution under network conditions indicated by the received combination of values for the set of features, and to output the obtained set of conditional state transition probabilities at the interface.

* * * * *